US012231776B2

(12) United States Patent
Ono

(10) Patent No.: US 12,231,776 B2
(45) Date of Patent: Feb. 18, 2025

(54) DISTANCE MEASURING DEVICE

(71) Applicant: SONY SEMICONDUCTOR SOLUTIONS CORPORATION, Kanagawa (JP)

(72) Inventor: Hiroaki Ono, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 317 days.

(21) Appl. No.: 17/310,804

(22) PCT Filed: Feb. 10, 2020

(86) PCT No.: PCT/JP2020/005036
§ 371 (c)(1),
(2) Date: Aug. 25, 2021

(87) PCT Pub. No.: WO2020/184028
PCT Pub. Date: Sep. 17, 2020

(65) Prior Publication Data
US 2022/0046158 A1 Feb. 10, 2022

(30) Foreign Application Priority Data

Mar. 11, 2019 (JP) .................. 2019-044283

(51) Int. Cl.
*H04N 23/72* (2023.01)
*G01S 17/46* (2006.01)
*G06T 7/70* (2017.01)

(52) U.S. Cl.
CPC ............ *H04N 23/72* (2023.01); *G01S 17/46* (2013.01); *G06T 7/70* (2017.01); *G06T 2207/10028* (2013.01)

(58) Field of Classification Search
None
See application file for complete search history.

(56) References Cited

U.S. PATENT DOCUMENTS

2008/0130015 A1\* 6/2008 Lu .................. G06V 10/145
356/610
2016/0321824 A1\* 11/2016 Karasawa ............ G01N 21/80
(Continued)

FOREIGN PATENT DOCUMENTS

| JP | 2005-010313 A | 1/2005 |
| JP | 2012-029130 A | 2/2012 |
| JP | 2018-117117 A | 7/2018 |

OTHER PUBLICATIONS

International Search Report and Written Opinion of PCT Application No. PCT/JP2020/005036, issued on Mar. 17, 2020, 08 pages of ISRWO.

*Primary Examiner* — Eileen M Adams
(74) *Attorney, Agent, or Firm* — CHIP LAW GROUP

(57) ABSTRACT

When a light receiving unit (12) performs light reception for each phase according to light emission of a light source unit (11), a distance measuring unit (131) calculates distance information on the basis of a light reception signal for each phase output by the light receiving unit according to the light reception for each phase. A control unit (130) controls a level of the light reception signal for each phase in accordance with the calculation of the distance information based on the light reception signal for each phase. An adjustment unit (132) adjusts a generation unit that generates an image signal on the basis of the light reception signal for each phase and a level of the image signal according to an adjustment value. The control unit generates the adjustment value on the basis of the light reception signal for each p phase.

9 Claims, 19 Drawing Sheets

(56) References Cited

U.S. PATENT DOCUMENTS

2017/0184722 A1*  6/2017  Park .................... G01S 7/4915
2017/0243367 A1*  8/2017  Lee ..................... H04N 25/704
2019/0195478 A1*  6/2019  Hayrapetian ........... F21V 21/38

* cited by examiner

DISTANCE MEASURING DEVICE

CROSS REFERENCE TO RELATED APPLICATIONS

This application is a U.S. National Phase of International Patent Application No. PCT/JP2020/005036 filed on Feb. 10, 2020, which claims priority benefit of Japanese Patent Application No. JP 2019-044283 filed in the Japan Patent Office on Mar. 11, 2019. Each of the above-referenced applications is hereby incorporated herein by reference in its entirety.

FIELD

The present invention relates to a distance measuring device.

BACKGROUND

There is known a distance measuring system called Time of Flight (ToF) that measures a distance to a measurement object on the basis of a time from when light is emitted from a light source to when reflected light of the light reflected by the measurement object is received by a light receiving unit. In the distance measurement of the ToF system, the light received by the light receiving unit includes ambient light such as sunlight in addition to the reflected light of the light emitted from the light source effective for distance measurement. A distance measuring device (hereinafter, a ToF system distance measuring device) that performs distance measurement by the ToF system acquires a distance to the measurement object on the basis of a reflected light component obtained by removing a component of the ambient light from the light received by the light receiving unit.

In the ToF system distance measuring device, an automatic exposure (AE) function may be mounted in order to receive light with appropriate luminance. By using the AE function, exposure (luminance) is automatically adjusted according to brightness of a photographing scene or the like, and excellent distance measurement accuracy can be obtained regardless of the photographing scene.

CITATION LIST

Patent Literature

Patent Literature 1: JP 2018-117117 A

SUMMARY

Technical Problem

Incidentally, there is a case where it is desired that an image by light including an ambient light component or an image by light of a reflected light component with the ambient light component removed is used for other purposes other than distance measurement, the images being acquired in the ToF system distance measuring device. As described above, in a case where each image acquired in the ToF system distance measuring device is secondarily used, it is not preferable that the luminance of each image is changed by the AE function in accordance with the distance measurement by a ToF system.

An object of the present disclosure is to provide a distance measuring device capable of improving convenience when secondarily using an image adjusted corresponding to a ToF system.

Solution to Problem

For solving the problem described above, a distance measuring device according to one aspect of the present disclosure has a distance measuring unit that calculates, when a light receiving unit performs light reception for each phase according to light emission of a light source unit, distance information on the basis of a light reception signal for each phase output by the light receiving unit according to the light reception for each phase; a control unit that controls a level of the light reception signal for each phase in accordance with the calculation of the distance information based on the light reception signal for each phase; a generation unit that generates an image signal on the basis of the light reception signal for each phase; and an adjustment unit that adjusts a level of the image signal according to an adjustment value, wherein the control unit generates the adjustment value on the basis of the light reception signal for each phase controlled according to the calculation of the distance information.

DESCRIPTION OF EMBODIMENTS

Figure 1:
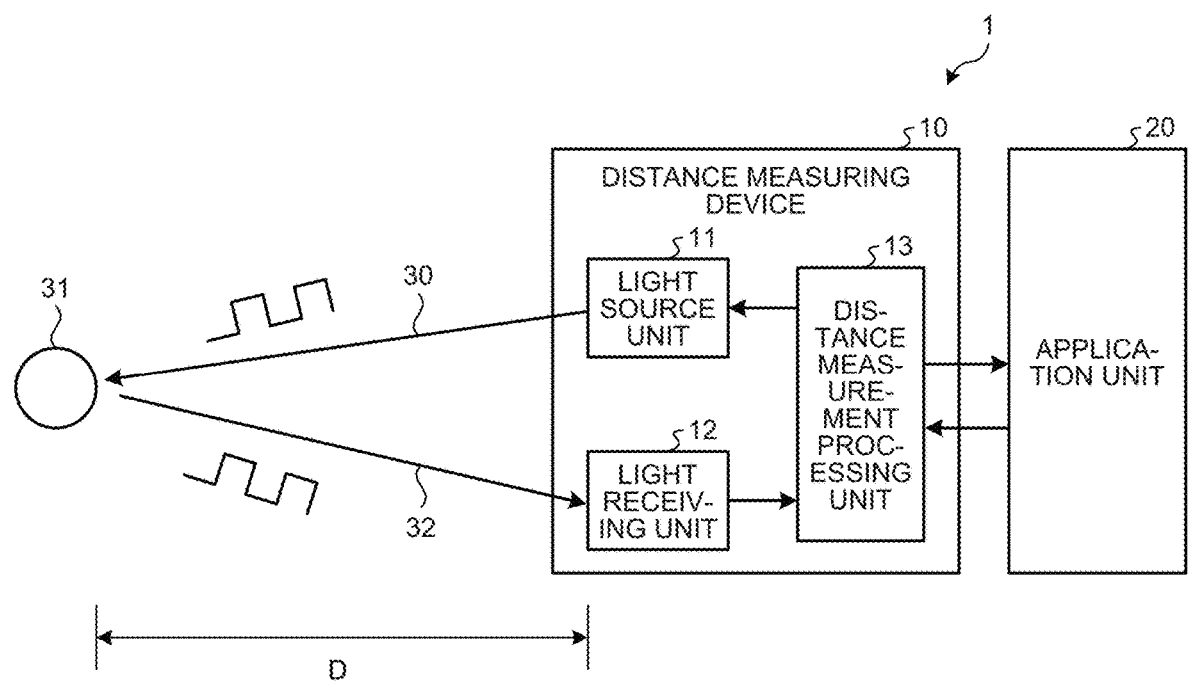
FIG. 1 is a block diagram illustrating a configuration of one example of an electronic device using a distance measuring device applicable to each embodiment.

Hereinafter, embodiments of the present disclosure will be described in detail on the basis of the drawings. Incidentally, in each of the following embodiments, the same reference numerals are given to the same portions, and duplicate description is not given.

Configuration Common to Each Embodiment

The present disclosure is suitable for use in a technology for performing distance measurement using light. Prior to the description of the embodiment of the present disclosure, an indirect time of flight (ToF) system will be described as one of distance measuring systems applied to the embodiment in order to facilitate understanding. The indirect ToF system is a technology of irradiating a measurement object with light source light (for example, laser light in an infrared region) modulated by, for example, pulse width modulation (PWM), receiving reflected light thereof by a light receiving element, and measuring a distance to the measurement object on the basis of a phase difference in the received reflected light.

FIG. 1 is a block diagram illustrating a configuration of one example of an electronic device using a distance measuring device applicable to each embodiment. In FIG. 1, an electronic device 1 includes a distance measuring device 10 and an application unit 20. The application unit 20 is realized, for example, by a program operating on a central processing unit (CPU), requests the distance measuring device 10 to execute distance measurement, and receives distance information or the like which is a result of the distance measurement from the distance measuring device 10.

The distance measuring device 10 includes a light source unit 11, a light receiving unit 12, and a distance measurement processing unit 13. The light source unit 11 includes, for example, a light emitting element that emits light having a wavelength in an infrared region, and a drive circuit that drives the light emitting element to emit light. For example, a light emitting diode (LED) can be applied as the light emitting element included in the light source unit 11. The present invention is not limited thereto, and a vertical cavity surface emitting laser (VCSEL) in which a plurality of light emitting elements is formed in an array can also be applied as the light emitting element included in the light source unit 11. Hereinafter, unless otherwise specified, "the light emitting element of the light source unit 11 emits light" will be described as "the light source unit 11 emits light" or the like.

The light receiving unit 12 includes, for example, a light receiving element capable of detecting light having a wavelength in an infrared region, and a signal processing circuit that outputs a pixel signal corresponding to the light detected by the light receiving element. A photodiode can be applied as the light receiving element included in the light receiving unit 12. Hereinafter, unless otherwise specified, "the light receiving element included in the light receiving unit 12 receives light" will be described as "the light receiving unit 12 receives light" or the like.

The distance measurement processing unit 13 executes distance measurement processing in the distance measuring device 10 in response to a distance measurement instruction from the application unit 20, for example. For example, the distance measurement processing unit 13 generates a light source control signal for driving the light source unit 11 and supplies the light source control signal to the light source unit 11. Further, the distance measurement processing unit 13 controls light reception by the light receiving unit 12 in synchronization with the light source control signal supplied to the light source unit 11. For example, the distance measurement processing unit 13 generates an exposure control signal for controlling an exposure period in the light receiving unit 12 in synchronization with the light source control signal, and supplies the exposure control signal to the light receiving unit 12. The light receiving unit 12 outputs a valid pixel signal within the exposure period indicated by the exposure control signal.

The distance measurement processing unit 13 calculates distance information on the basis of the pixel signal output from the light receiving unit 12 according to the light reception. Further, the distance measurement processing unit 13 can also generate predetermined image information on the basis of the pixel signal. The distance measurement processing unit 13 passes the distance information and the image information calculated and generated on the basis of the pixel signal to the application unit 20.

In such a configuration, for example, in accordance with an instruction to execute distance measurement from the application unit 20, the distance measurement processing unit 13 generates a light source control signal for driving the light source unit 11 and supplies the light source control signal to the light source unit 11. Herein, the distance measurement processing unit 13 generates a light source control signal modulated into a rectangular wave having a predetermined duty by the PWM, and supplies the light source control signal to the light source unit 11. At the same time, the distance measurement processing unit 13 controls the light reception by the light receiving unit 12 on the basis of the exposure control signal synchronized with the light source control signal.

In the distance measuring device 10, the light source unit 11 blinks and emits light according to a predetermined duty according to the light source control signal generated by the distance measurement processing unit 13. The light emitted from the light source unit 11 is emitted from the light source unit 11 as emission light 30. The emission light 30 is reflected by a measurement object 31, for example, and is received as a reflected light 32 by the light receiving unit 12. The light receiving unit 12 supplies a pixel signal corresponding to the reception of the reflected light 32 to the distance measurement processing unit 13. Incidentally, in practice, the light receiving unit 12 receives surrounding ambient light in addition to the reflected light 32, and the pixel signal includes a component of the ambient light together with a component of the reflected light 32.

The distance measurement processing unit 13 executes light reception by the light receiving unit 12 a plurality of times in different phases. The distance measurement processing unit 13 calculates a distance D to the measurement object on the basis of a difference between pixel signals due to light reception at different phases. Further, on the basis of the difference between the pixel signals, the distance measurement processing unit 13 calculates first image information obtained by extracting the component of the reflected light 32, and second image information including the component of the reflected light 32 and the component of the ambient light. Hereinafter, the first image information is referred to as directly reflected light information, and the second image information is referred to as RAW image information.

Distance Measurement by Indirect ToF System Applicable to Each Embodiment

Figure 2:
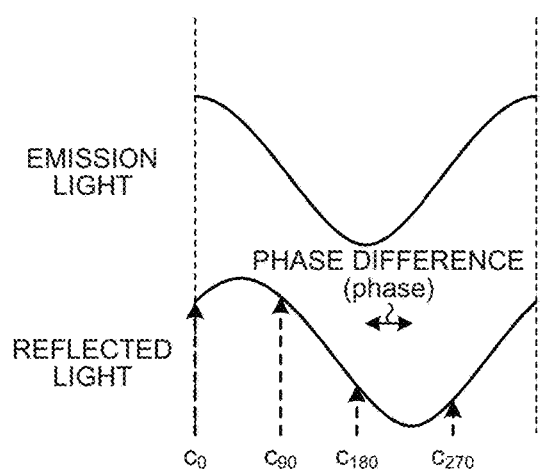
FIG. 2 is a diagram for explaining a principle of an indirect ToF system.

Next, distance measurement by the indirect ToF system applicable to each embodiment will be described. FIG. 2 is a diagram for explaining a principle of the indirect ToF system. In FIG. 2, light modulated by a sine wave is used as the emission light 30 emitted by the light source unit 11. Ideally, the reflected light 32 is a sine wave having a phase difference phase corresponding to the distance D with respect to the emission light 30.

The distance measurement processing unit 13 performs a plurality of times of sampling on the pixel signal obtained by receiving the reflected light 32 at different phases, and acquires a light amount value indicating a light amount for each sampling. In the example of FIG. 2, light amount values $C_0$, $C_{90}$, $C_{180}$, and $C_{270}$ are acquired in respective phases of a phase of 0°, a phase of 90°, a phase of 180°, and a phase of 270° which are different by 90° in phase with respect to the emission light 30. In the indirect ToF system, the distance information is calculated on the basis of a difference between light amount values of a set having phases different by 180° among the phases of 0°, 90°, 180°, and 270°.

Figure 3:
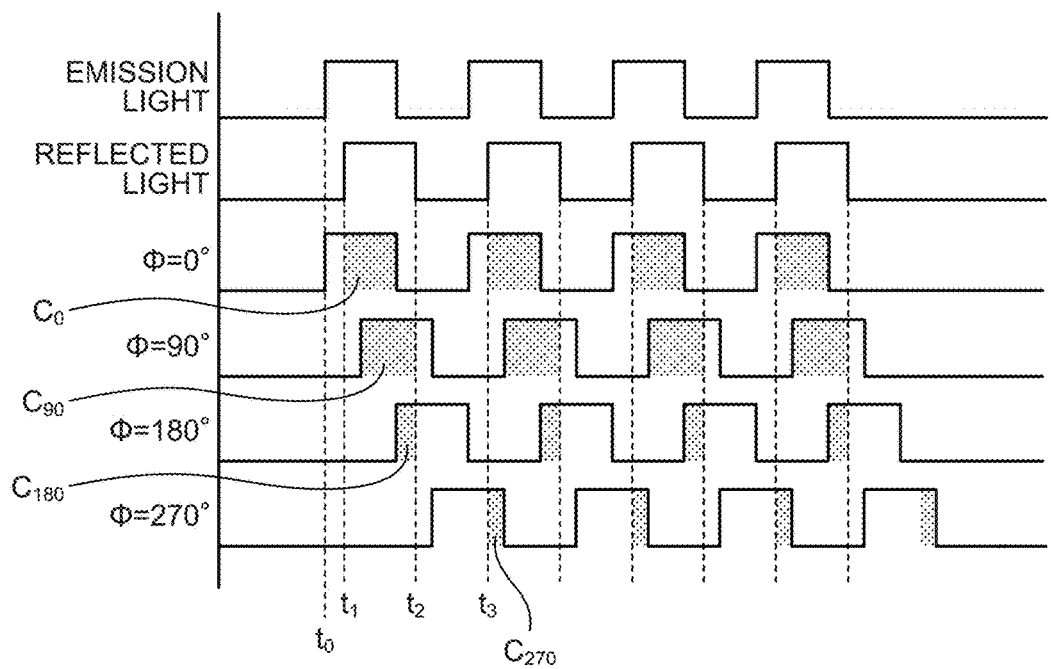
FIG. 3 is a diagram illustrating an example of a case where emission light from a light source unit is a rectangular wave modulated by PWM.

A method of calculating the distance information in the indirect ToF system will be described more specifically with reference to FIG. 3. FIG. 3 is a diagram illustrating an example of a case where the emission light 30 from the light source unit 11 is a rectangular wave modulated by the PWM. In FIG. 3, the emission light 30 from the light source unit 11 and the reflected light 32 reaching the light receiving unit 12 are illustrated from an upper side. As illustrated in the upper side of FIG. 3, the light source unit 11 periodically blinks at a predetermined duty to emit the emission light 30.

FIG. 3 further illustrates exposure control signals at the phase of 0° (described as $\Phi=0°$), the phase of 90° (described as $\Phi=90°$), the phase of 180° (described as $\Phi=$) 180°, and the phase of 270° (described as $\Phi=270°$) of the light receiving unit 12. For example, a period during which the exposure control signal is in a high state is an exposure period during which the light receiving unit 12 outputs a valid pixel signal.

In the example of FIG. 3, the emission light 30 is emitted from the light source unit 11 at time $t_0$, and the reflected light 32 obtained by reflecting the emission light 30 by the measurement object reaches the light receiving unit 12 at time $t_1$ after the delay according to the distance D from the time $t_0$ to the measurement object.

On the other hand, in the light receiving unit 12, in accordance with the exposure control signal from the distance measurement processing unit 13, the exposure period of the phase of 0° starts in synchronization with the time $t_0$ of the emission timing of the emission light 30 in the light source unit 11. Similarly, in the light receiving unit 12, the exposure periods of the phase of 90°, the phase of 180°, and the phase of 270° start in accordance with the exposure control signal from the distance measurement processing unit 13. Herein, the exposure period in each phase follows the duty of the emission light 30. Incidentally, in the example of FIG. 3, the exposure periods of the respective phases are illustrated as being temporally parallel for the sake of explanation. However, in practice, in the light receiving unit 12, the exposure periods of the respective phases are sequentially specified, and the light amount values $C_0$, $C_{90}$, $C_{180}$, and $C_{270}$ of the respective phases are acquired.

In the example of FIG. 3, the arrival timings of the reflected light 32 are times $t_1$, $t_2$, $t_3$, and so on, and the light amount value $C_0$ at the phase of 0° is acquired as an integral value of the received light amount from the time $t_0$ to the end time of the exposure period including the time $t_0$ at the phase of 0°. On the other hand, in the phase of 180° which is different by 180° from the phase of 0°, the light amount value $C_{180}$ is acquired as an integral value of the received light amount from the start time of the exposure period at the phase of 180° to the time $t_2$ of the falling of the reflected light 32 included in the exposure period.

Also for the phase of C90 and the phase of 270° which is different by 180° from the phase of 90°, similarly to the case of the phases of 0° and 180° described above, the integral value of the received light amounts in the periods in which the reflected light 32 arrives within respective exposure periods are acquired as the light amount values $C_{90}$ and $C_{270}$.

Among these light amount values $C_0$, $C_{90}$, $C_{180}$, and $C_{270}$, as shown in the following equations (1) and (2), a difference I and a difference Q are obtained on the basis of a combination of light amount values having phases different by 180°.

$$I = C_0 - C_{180} \quad (1)$$

$$Q = C_{90} - C_{270} \quad (2)$$

The phase difference phase is calculated by the following equation (3) on the basis of these differences I and Q. Incidentally, in the equation (3), the phase difference phase is defined in a range of (0≤phase<2π).

$$\text{phase} = \tan^{-1}(Q/I) \quad (3)$$

Distance information Depth is calculated by the following equation (4) using the phase difference phase and a predetermined coefficient range.

$$\text{Depth} = (\text{phase} \times \text{range})/2\pi \quad (4)$$

The component (directly reflected light information) of the reflected light 32 can be extracted from the component of the light received by the light receiving unit 12 on the basis of the differences I and Q. Directly reflected light information DiRefl is calculated by the following equation (5) using the absolute values of the differences I and Q.

$$\text{DiRefl} = |I| + |Q| \quad (5)$$

RAW image information RAW can be calculated as an average value of the light amount values $C_0$, $C_{90}$, $C_{180}$, and $C_{270}$ as shown in the following equation (6).

$$\text{RAW} = (C_0 + C_{90} + C_{180} + C_{270})/4 \quad (6)$$

Figure 4:
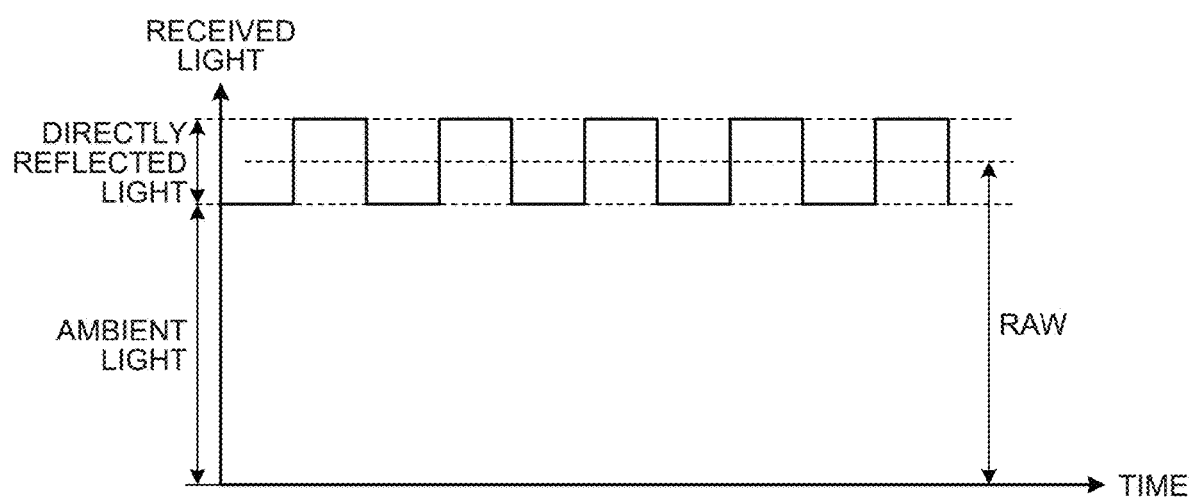
FIG. 4 is a diagram illustrating an example of an amount of light received by a light receiving unit.

FIG. 4 is a diagram illustrating an example of the amount of the light received by the light receiving unit 12. As described above, the light receiving unit 12 also receives the ambient light to which the emission light 30 from the light source unit 11 does not contribute in addition to the reflected light 32 formed when the emission light 30 from the light source unit 11 is reflected by the measurement object 31, that is, the directly reflected light. Therefore, the amount of the light received by the light receiving unit 12 is the sum of the amount of the directly reflected light and the amount of the ambient light. By the calculation of the above-described equations (1) to (3) and (5), the component of the ambient light is canceled, and the component of the directly reflected light is extracted.

On the other hand, an RAW image is an average value of the light amount values $C_0$, $C_{90}$, $C_{180}$, and $C_{270}$ of the respective phases as shown in the above-described equation (6), and thus the RAW image includes a component of the ambient light as illustrated in FIG. 4.

Next, a method for acquiring the light amount values C0, C90, C180, and C270 of respective phases and a method for calculating the distance information and the directly reflected light information DiRefl, which are applicable to each embodiment, will be described more specifically with reference to FIGS. 5A, 5B, and 5C.

Figure 5A:
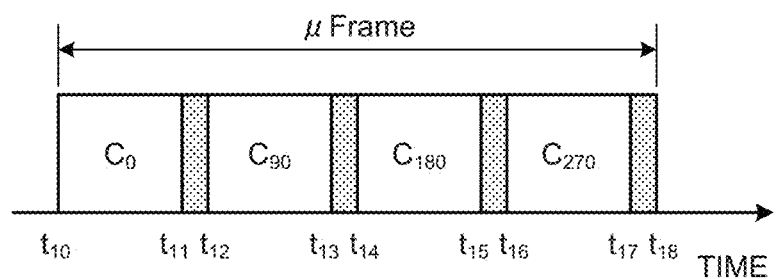
FIG. 5A is a diagram for explaining a first method of acquiring each light amount value and calculating each piece of information applicable to each embodiment.

FIG. 5A is a diagram for explaining a first method of acquiring each light amount value and calculating each piece of information applicable to each embodiment. In FIG. 5A, the light receiving unit 12 sequentially acquires light amount values $C_0$, $C_{90}$, $C_{180}$, and $C_{270}$ for each phase. In the example of FIG. 5A, the light receiving unit 12 performs exposure with the phase of 0° in a period of time $t_{10}$ to time $t_{11}$, and performs exposure with the phase of 90° in a period of time $t_{12}$ to time $t_{13}$ after a predetermined time (for example, processing switching time) from time $t_{11}$. Similarly, light reception with the phase of 180° is performed in a period of time $t_{14}$ to time $t_{15}$ after a predetermined time from time $t_{13}$, and exposure with the phase of 270° is performed in a period of time $t_{16}$ to time $t_{17}$ after a predetermined time from time $t_{15}$.

At time $t_{18}$ after a predetermined time from time $t_{17}$, the above-described operation from the time $t_{10}$ is executed again.

The method of sequentially acquiring the light amount values $C_0$, $C_{90}$, $C_{180}$, and $C_{270}$ for each phase illustrated in FIG. 5A is referred to as a one-tap method.

Here, a sequence of performing exposure with each phase is assumed to be one microframe (μFrame). In the example of FIG. 5A, a period of time $t_{10}$ to time $t_{18}$ is a period of one microframe. The period of one microframe is shorter than one frame period (for example, 1/30 sec) of imaging, and processing of one microframe can be executed a plurality of times within one frame period.

The distance measurement processing unit 13 stores the light amount values $C_0$, $C_{90}$, $C_{180}$, and $C_{270}$ acquired within the period of one microframe and acquired sequentially in each phase in, for example, a memory. The distance measurement processing unit 13 calculates the distance information Depth, the directly reflected light information DiRefl, and the RAW image information RAW on the basis of the light amount values $C_0$, $C_{90}$, $C_{180}$, and $C_{270}$ stored in the memory.

In this case, the differences I and Q, the phase difference phase, and the distance information Depth can be calculated by the above-described equations (1) to (4). Further, the RAW image information RAW can be calculated using the above-described equation (6). On the other hand, here, the directly reflected light information DiRefl can be calculated using the following equation (7).

$$\text{DiRefl} = (I^2 + Q^2)^{1/2} \quad (7)$$

Figure 5B:
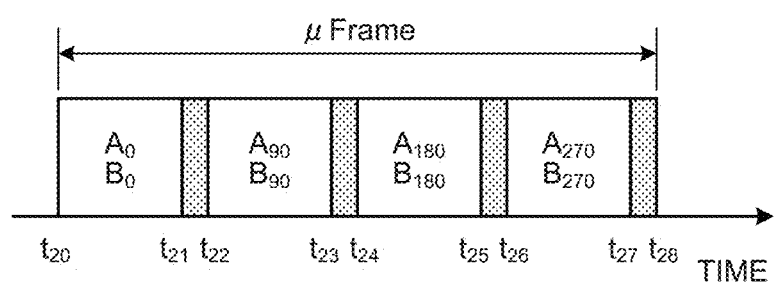
FIG. 5B is a diagram for explaining a second method of acquiring each light amount value and calculating each piece of information applicable to each embodiment.

FIG. 5B is a diagram for explaining a second method of acquiring each light amount value and calculating each piece of information applicable to each embodiment. In the second method, the light receiving unit 12 includes two reading circuits (taps A and B) for one light receiving element, and reading by the tap A and the tap B can be executed sequentially (alternately) (details will be described later).

In FIG. 5B, the light receiving unit 12 sequentially executes the reading of the tap A and the tap B in each phase. Further, the light receiving unit 12 sequentially executes the reading of each phase within a period of one microframe.

That is, in the example of FIG. 5B, the light receiving unit 12 performs exposure with the phase of 0° in a period of time $t_{20}$ to time $t_{21}$. The distance measurement processing unit 13 obtains a light amount value $A_0$ and a light amount value $B_0$ on the basis of the pixel signals read by the tap A and the tap B, respectively. The light receiving unit 12 performs exposure with the phase of 90° in a period of time $t_{22}$ to time $t_{23}$ after a predetermined time from time $t_{21}$. The distance measurement processing unit 13 obtains a light amount value $A_{90}$ and a light amount value $B_{90}$ on the basis of the pixel signals read by the tap A and the tap B, respectively.

Similarly, exposure with the phase of 180° is performed in a period of time $t_{24}$ to time $t_{25}$ after a predetermined time from time $t_{23}$. The distance measurement processing unit 13 obtains a light amount value $A_{180}$ and a light amount value $B_{180}$ on the basis of the pixel signals read by the tap A and the tap B, respectively. Further, the light receiving unit 12 performs exposure with the phase of 270° in a period of time $t_{26}$ to time $t_{27}$ after a predetermined time from time $t_{25}$. The distance measurement processing unit 13 obtains a light amount value $A_{270}$ and a light amount value $B_{270}$ on the basis of the pixel signals read by the tap A and the tap B, respectively.

At time $t_{28}$ after a predetermined time from time $t_{27}$, the above-described operation from the time $t_{20}$ is executed again.

The method of sequentially executing the reading by the taps A and B for each of the phases of 0°, 90°, 180°, and 270° and obtaining each light amount value based on the reading by the taps A and B for each phase as illustrated in FIG. 5B is referred to as a four-phase/two-tap method.

In the case of this second method, the differences I and Q are calculated by the following equations (8) and (9) using the light amount values $A_0$ and $B_0$, $A_{90}$ and $B_{90}$, $A_{180}$ and $B_{180}$, and $A_{270}$ and $B_{270}$.

$$I = C_0 - C_{180} = (A_0 - B_0) - (A_{180} - B_{180}) \tag{8}$$

$$Q = C_{90} - C_{270} = (A_{90} - B_{90}) - (A_{270} - B_{270}) \tag{9}$$

The phase difference phase, the distance information Depth, and the directly reflected light information DiRefl can be calculated by the above-described equations (3), (4), and (7) using the differences I and Q calculated by the equations (8) and (9). Further, the RAW image information RAW can be calculated as average values of the light amount values $A_0$ and $B_0$, $A_{90}$ and $B_{90}$, $A_{180}$ and $B_{180}$, and $A_{270}$ and $B_{270}$, following the above-described equation (6).

In the four-phase/two-tap method illustrated in FIG. 5B, the exposure period in each phase is made redundant by the tap A and the tap B. Therefore, it is possible to improve the S/N ratios of the calculated distance information Depth, directly reflected light information DiRefl, and RAW image information RAW.

Figure 5C:
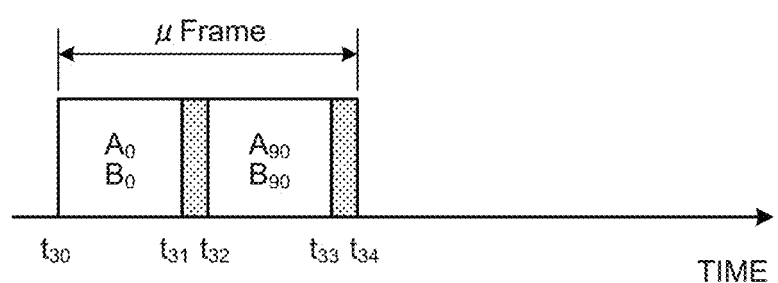
FIG. 5C is a diagram for explaining a third method of acquiring each light amount value and calculating each piece of information applicable to each embodiment.

FIG. 5C is a diagram for explaining a third method of acquiring each light amount value and calculating each piece of information applicable to each embodiment. In the third method, the light receiving unit 12 includes the tap A and the tap B similarly to the above-described second method, and sequentially executes the reading by the tap A and the tap B. Further, the light receiving unit 12 sequentially executes the reading of the phases of 0° and 90° among the phases of 0°, 90°, 180°, and 270° described above. In the third method, the reading periods of the phases 0° and 90° are set as a period of one microframe.

In the case of FIG. 5C, the reading sequence is the same sequence as time $t_{20}$ to time $t_{24}$ in FIG. 5B described above. That is, the light receiving unit 12 performs exposure with the phase of 0° in a period of time $t_{30}$ to time $t_{31}$. The distance measurement processing unit 13 obtains a light amount value $A_0$ and a light amount value $B_0$ on the basis of the pixel signals read by the tap A and the tap B, respectively. The light receiving unit 12 performs exposure with the phase of 90° in a period of time $t_{32}$ to time $t_{33}$ after a predetermined time from time $t_{31}$. The distance measurement processing unit 13 obtains a light amount value $A_{90}$ and a light amount value $B_{90}$ on the basis of the pixel signals read by the tap A and the tap B, respectively.

At time $t_{34}$ after a predetermined time from time $t_{33}$, the above-described operation from the time $t_{30}$ is executed again.

The method of sequentially executing the reading by the taps A and B for each of the phases of 0° and 90° and obtaining each light amount value based on the reading by the taps A and B for each of the phases of 0° and 90° as illustrated in FIG. 5C is referred to as a two-phase/two-tap method.

Here, in the two-phase/two-tap method in FIG. 5C, the reading by the tap A and the tap B is sequentially executed in each of the phases of 0° and 90°. This corresponds to, for example, executing reading of the phase of 0° and the phase of 180° having a phase different by 180° from the phase of 0° at the phase of 0°. Similarly, this corresponds to executing reading of the phase of 90° and the phase of 270° having a phase different by 180° from the phase of 90° at the phase of 90°.

Figure 6:
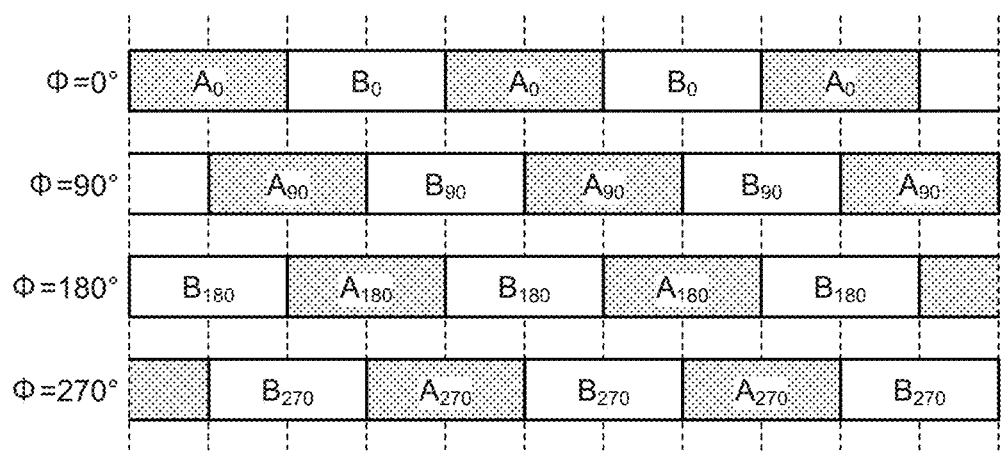
FIG. 6 is a diagram illustrating an example of an exposure period of a tap A and a tap B in each phase for each light receiving unit.

The phase difference of reading by the tap A and the tap B in the light receiving unit 12 will be described with reference to FIG. 6. FIG. 6 is a diagram illustrating an example of the exposure periods of the tap A and the tap B at each of the phases of 0°, 90°, 180°, and 270° for each light receiving unit 12 (for each light receiving element). Incidentally, in FIG. 6, for the sake of explanation, the exposure periods of the respective phases are arranged in parallel with the phases aligned. In practice, as described with reference to FIGS. 5A, 5B, and 5C, the exposure of each phase is sequentially executed.

In FIG. 6, exposure (illustrated as the light amount values $A_0$ and $B_0$, respectively) by the tap A and the tap B with the phase of 0° is executed sequentially (alternately). On the other hand, exposure by the tap A and the tap B with the phase of 180° is delayed by 180° with respect to the exposure by the tap A and the tap B with the phase of 0°, and the exposure by the tap A and the tap B is executed sequentially. At this time, the phases of the exposure period of the tap A at the phase of 0° and the exposure period of the tap B at the phase of 180° coincide with each other. Similarly, the phases of the exposure period by the tap B at the phase of 0° and the exposure period by the tap A at the phase of 180° coincide with each other.

That is, for example, the exposure periods by the tap A and the tap B at the phase of 0° can be considered as the exposure period at the phase of 0° and the exposure period at the phase of 180°. Therefore, in the case of the third method, the differences I and Q are calculated by the following equations (10) and (11) using the light amount values $A_0$ and $B_0$ and $A_{90}$ and $B_{90}$.

$$I = C_0 - C_{180} = (A_0 - B_0) \tag{10}$$

$$Q = C_{90} - C_{270} = (A_{90} - B_{90}) \tag{11}$$

The phase difference phase, the distance information Depth, and the directly reflected light information DiRefl can be calculated by the above-described equations (3), (4), and (7) using the differences I and Q calculated by the equations (10) and (11). Further, the RAW image information RAW can be calculated as average values of the light amount values $A_0$ and $B_0$ and $A_{90}$ and $B_{90}$, following the above-described equation (6).

In this manner, two reading circuits (taps A and B) are provided for one light receiving element, and reading by the tap A and the tap B is executed sequentially. As a result, an exposure period in which phases are different by 180° can be realized in one phase (for example, the phase of 0°). Therefore, in the two-phase/two-tap method illustrated in FIG. 5C, a result equivalent to that of the one-tap method illustrated in FIG. 5A can be obtained in a shorter time than that of the one-tap method.

Configuration Applicable to Each Embodiment

Figure 7:
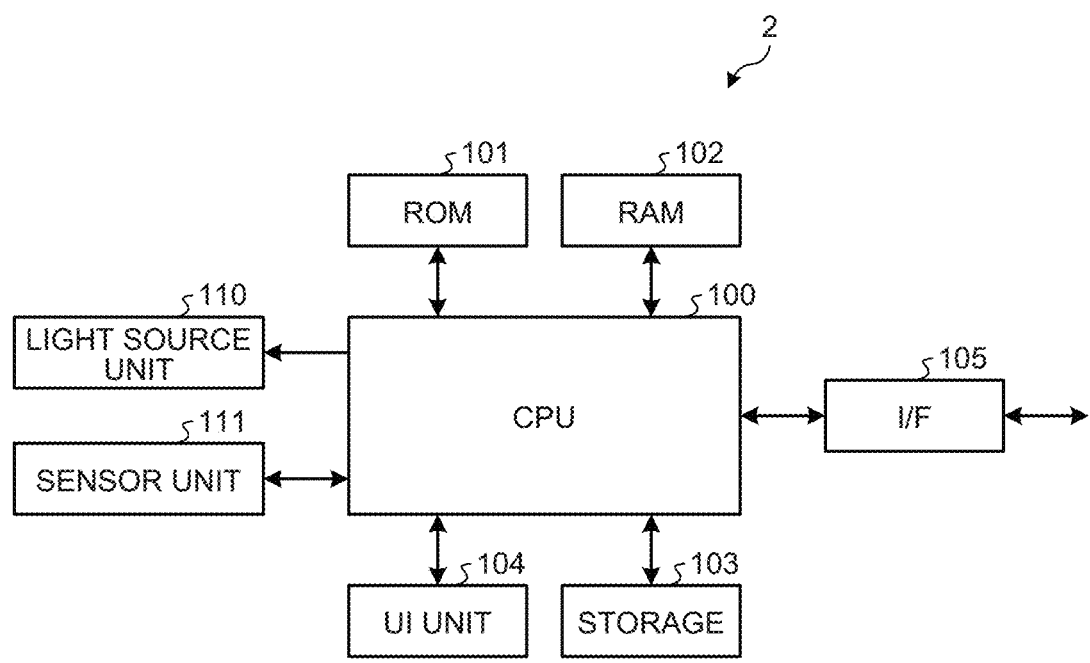
FIG. 7 is a block diagram illustrating a configuration of one example of an electronic device applicable to each embodiment.

Next, an example of a configuration applicable to each embodiment will be described. FIG. 7 is a block diagram illustrating a configuration of one example of an electronic device applicable to each embodiment. In FIG. 7, an electronic device 2 includes a central processing unit (CPU) 100, a read only memory (ROM) 101, a random access memory (RAM) 102, a storage 103, a user interface (UI) unit 104, and an interface (I/F) 105. Further, the electronic device 2 includes a light source unit 110 and a sensor unit 111 corresponding to the light source unit 11 and the light receiving unit 12 in FIG. 1, respectively.

Incidentally, it is conceivable to apply, for example, a smartphone (multifunctional mobile phone terminal) or a tablet personal computer as the electronic device 2 illustrated in FIG. 7. The devices to which the electronic device 2 is applied are not limited to these smartphones and tablet personal computers.

The storage 103 is a nonvolatile storage medium such as a flash memory or a hard disk drive. The storage 103 can store various data and programs for operating the CPU 100. Further, the storage 103 can store an application program (hereinafter, abbreviated as an application) for realizing the application unit 20 described with reference to FIG. 1. The ROM 101 stores in advance programs and data for the CPU 100 to operate. The RAM 102 is a volatile storage medium that stores data.

According to the program stored in the storage 103 or the ROM 101, the CPU 100 operates using the RAM 102 as a work memory and controls the entire operation of the electronic device 2.

In the UI unit 104, various operators for operating the electronic device 2, a display element for displaying the state of the electronic device 2, and the like are arranged. The UI unit 104 may further include a display which displays an image captured by the sensor unit 111 described later. Further, this display may be a touch panel in which a display device and an input device are integrally formed, and the various operators may be configured by components displayed on the touch panel.

The light source unit 110 includes a light emitting element such as an LED or a VCSEL, and a driver for driving the light emitting element. In the light source unit 110, the driver generates a drive signal having a predetermined duty in response to an instruction from the CPU 100. The light emitting element emits light according to the drive signal generated by the driver and emits light modulated by the PWM as the emission light 30.

The sensor unit 111 includes a pixel array unit in which a plurality of light receiving elements is arranged in an array, and a drive circuit which drives the plurality of light receiving elements arranged in the pixel array unit and outputs a pixel signal read from each light receiving element. The pixel signal output from the sensor unit 111 is supplied to the CPU 100.

Next, the sensor unit 111 applicable to each embodiment will be described with reference to FIGS. 8 to 11.

Figure 8:
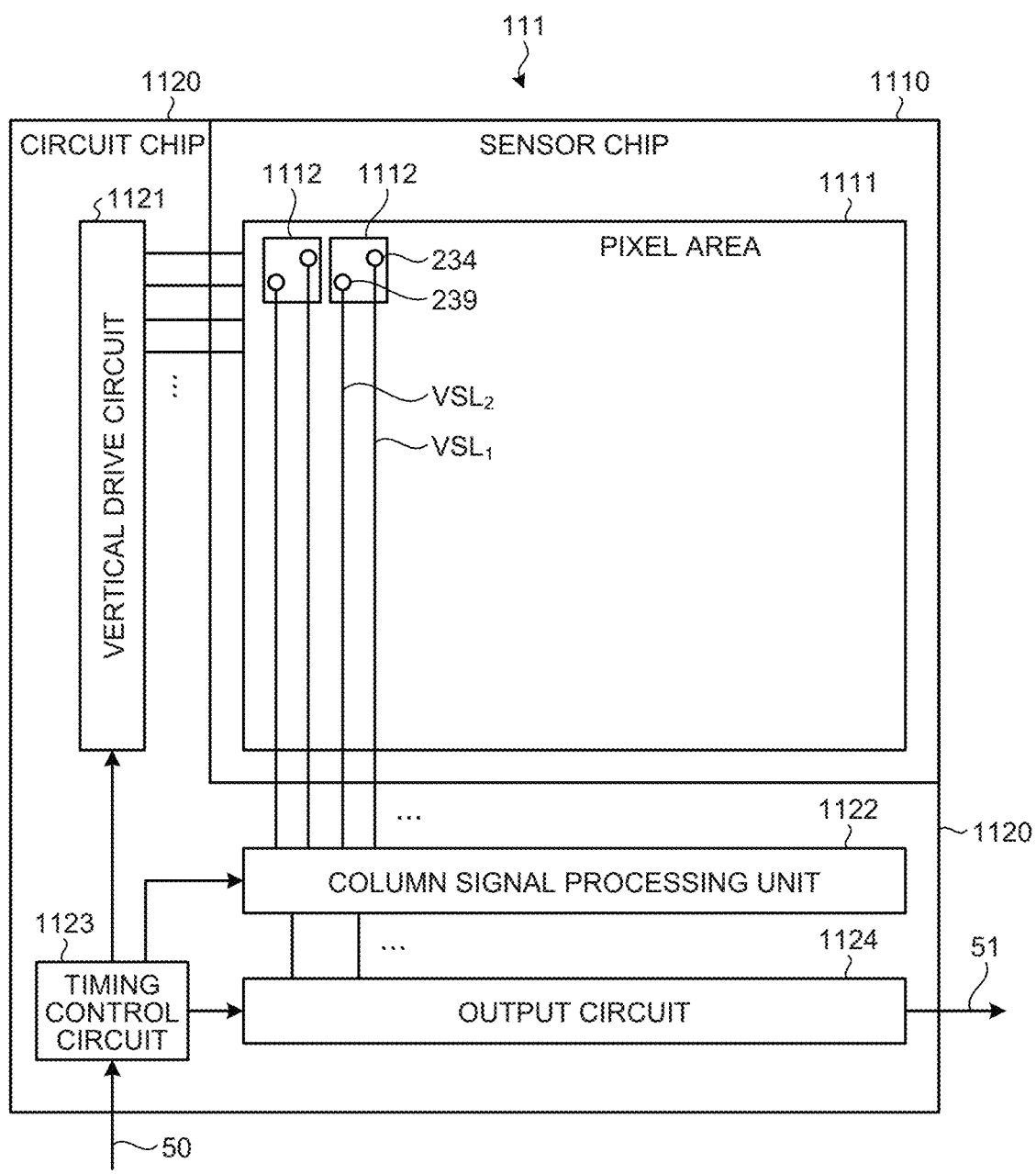
FIG. 8 is a block diagram illustrating an example of a configuration of a sensor unit applicable to each embodiment.

FIG. 8 is a block diagram illustrating an example of a configuration of the sensor unit 111 applicable to each embodiment. In FIG. 8, the sensor unit 111 has a laminated structure including a sensor chip 1110 and a circuit chip 1120 laminated on the sensor chip 1110. In this laminated structure, the sensor chip 1110 and the circuit chip 1120 are electrically connected through a connection portion (not illustrated) such as a via (VIA) or a Cu—Cu connection. In the example of FIG. 8, a state where the wiring of the sensor chip 1110 and the wiring of the circuit chip 1120 are connected by the connection portion is illustrated.

A pixel area 1111 includes a plurality of pixels 1112 arranged in an array on the sensor chip 1110. For example, an image signal of one frame is formed on the basis of pixel signals output from the plurality of pixels 1112 included in the pixel area 1111. Each pixel 1112 arranged in the pixel area 1111 can receive, for example, infrared light, performs photoelectric conversion on the basis of the received infrared light, and outputs an analog pixel signal. Two vertical signal lines $VSL_1$ and $VSL_2$ are connected to each pixel 1112 included in the pixel area 1111.

In the sensor unit 111, a vertical drive circuit 1121, a column signal processing unit 1122, a timing control circuit 1123, and an output circuit 1124 are further arranged on the circuit chip 1120.

The timing control circuit 1123 controls the drive timing of the vertical drive circuit 1121 in accordance with an element control signal supplied from the outside via a control line 50. Further, the timing control circuit 1123 generates a vertical synchronization signal on the basis of the element control signal. The column signal processing unit 1122 and the output circuit 1124 execute respective processing in synchronization with the vertical synchronization signal generated by the timing control circuit 1123.

The vertical signal lines $VSL_1$ and $VSL_2$ are wired in the vertical direction in FIG. 8 for each column of the pixels 1112. Assuming that the total number of columns in the pixel area 1111 is M columns (M is an integer of 1 or more), a total of 2×M vertical signal lines are wired in the pixel area 1111. Although details will be described later, each pixel 1112 includes two taps A (TAP_A) and B (TAP_B) which accumulate electric charges generated by photoelectric conversion. The vertical signal line $VSL_1$ is connected to the tap A of the pixel 1112, and the vertical signal line $VSL_2$ is connected to the tap B of the pixel 1112.

In the vertical signal line $VSL_1$, a pixel signal $AIN_{P1}$ which is an analog pixel signal based on the electric charge of the tap A of the pixel 1112 in the corresponding pixel column is output. Further, in the vertical signal line $VSL_2$, a pixel signal $AIN_{P2}$ which is an analog pixel signal based on the electric charge of the tap B of the pixel 1112 in the corresponding pixel column is output.

The vertical drive circuit 1121 drives each pixel 1112 included in the pixel area 1111 in units of pixel rows in accordance with timing control by the timing control circuit 1123, and outputs the pixel signals $AIN_{P1}$ and $AIN_{P2}$. The pixel signals $AIN_{P1}$ and $AIN_{P2}$ output from each pixel 1112 are supplied to the column signal processing unit 1122 via the vertical signal lines $VSL_1$ and $VSL_2$ of each column.

The column signal processing unit 1122 includes, for example, a plurality of AD converters provided for each pixel column corresponding to the pixel column of the pixel area 1111. Each AD converter included in the column signal processing unit 1122 executes AD conversion on the pixel signals $AIN_{P1}$ and $AIN_{P2}$ supplied via the vertical signal lines $VSL_1$ and $VSL_2$, and supplies the pixel signals $AIN_{P1}$ and $AIN_{P2}$ converted into digital signals to the output circuit 1124.

The output circuit 1124 executes signal processing such as correlated double sampling (CDS) processing on the pixel signals $AIN_{P1}$ and $AIN_{P2}$ converted into digital signals and output from the column signal processing unit 1122, and outputs the pixel signals $AIN_{P1}$ and $AIN_{P2}$ subjected to the signal processing to the outside of the sensor unit 111 via an output line 51 as the pixel signal read from the tap A and the pixel signal read from the tap B, respectively.

Figure 9:
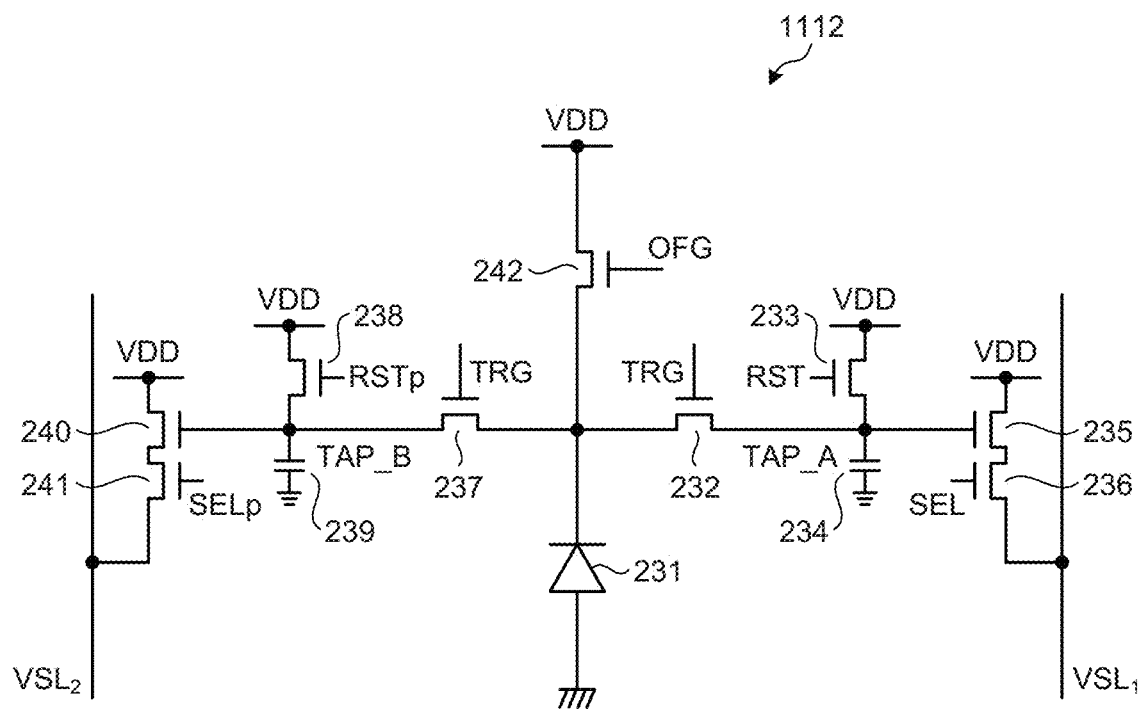
FIG. 9 is a circuit diagram illustrating a configuration of one example of a pixel applicable to each embodiment.

FIG. 9 is a circuit diagram illustrating a configuration of one example of the pixel 1112 applicable to each embodiment. The pixel 1112 includes a photodiode 231, two transfer transistors 232 and 237, two reset transistors 233 and 238, two floating diffusion layers 234 and 239, two amplification transistors 235 and 240, and two selection transistors 236 and 241. The floating diffusion layers 234 and 239 correspond to the tap A (described as TAP_A) and the tap B (described as TAP_B) described above, respectively.

The photodiode 231 is a light receiving element which photoelectrically converts received light to generate an electric charge. With a surface on which a circuit is arranged in a semiconductor substrate as a front surface, the photodiode 231 is arranged on the back surface with respect to the front surface. Such a solid-state imaging element is called a back-illuminated solid-state imaging element. Incidentally, instead of the back-illuminated configuration, a front-illuminated configuration in which the photodiode 231 is arranged on the front surface can also be used.

An overflow transistor 242 is connected between the cathode of the photodiode 231 and a power supply line VDD, and has a function of resetting the photodiode 231. That is, the overflow transistor 242 is turned on in response to an overflow gate signal OFG supplied from the vertical drive circuit 1121, thereby sequentially discharging the electric charge of the photodiode 231 to the power supply line VDD.

The transfer transistor 232 is connected between the cathode of the photodiode 231 and the floating diffusion layer 234. Further, the transfer transistor 237 is connected between the cathode of the photodiode 231 and the floating diffusion layer 239. In accordance with a transfer signal TRG supplied from the vertical drive circuit 1121, the transfer transistors 232 and 237 sequentially transfer the electric charges generated by the photodiode 231 to the floating diffusion layers 234 and 239, respectively.

The respective floating diffusion layers 234 and 239 corresponding to the taps A and B accumulate the electric charges transferred from the photodiode 231, convert the electric charges into voltage signals of voltage values corresponding to the accumulated electric charge amounts, and generate the pixel signals $AIN_{P1}$ and $AIN_{P2}$ which are analog pixel signals, respectively.

The two reset transistors 233 and 238 are connected between the power supply line VDD and the respective floating diffusion layers 234 and 239. The reset transistors 233 and 238 are turned on in response to reset signals RST and $RST_p$ supplied from the vertical drive circuit 1121, thereby extracting electric charges from the floating diffusion layers 234 and 239 and initializing the floating diffusion layers 234 and 239, respectively.

The two amplification transistors 235 and 240 are connected between the power supply line VDD and the respective selection transistors 236 and 241. The amplification transistors 235 and 240 amplify voltage signals obtained by converting electric charges into voltages in the floating diffusion layers 234 and 239, respectively.

The selection transistor 236 is connected between the amplification transistor 235 and the vertical signal line $VSL_1$. Further, the selection transistor 241 is connected between the amplification transistor 240 and the vertical signal line $VSL_2$. The selection transistors 236 and 241 are turned on in response to the selection signals SEL and $SEL_p$ supplied from the vertical drive circuit 1121, thereby outputting the pixel signals $AIN_{P1}$ and $AIN_{P2}$ amplified by the amplification transistors 235 and 240 to the vertical signal line $VSL_1$ and the vertical signal line $VSL_2$, respectively.

The vertical signal line $VSL_1$ and the vertical signal line $VSL_2$ connected to the pixel 1112 are connected to the input end of one AD converter included in the column signal processing unit 1122 for each pixel column. The vertical signal line $VSL_1$ and the vertical signal line $VSL_2$ supply the pixel signals $AIN_{P1}$ and $AIN_{P2}$ output from the pixels 1112 to the AD converter included in the column signal processing unit 1122 for each pixel column.

Figure 10:
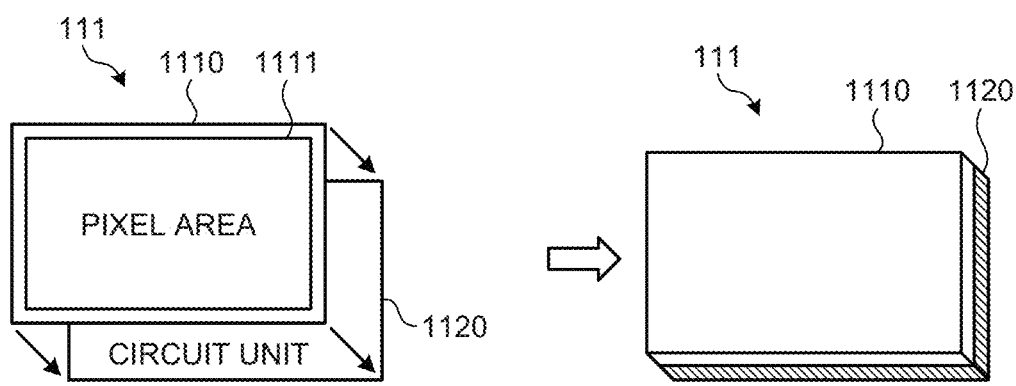
FIG. 10 is a diagram illustrating an example of a sensor unit formed by a laminated CIS having a layer structure applicable to each embodiment.
Figure 11:
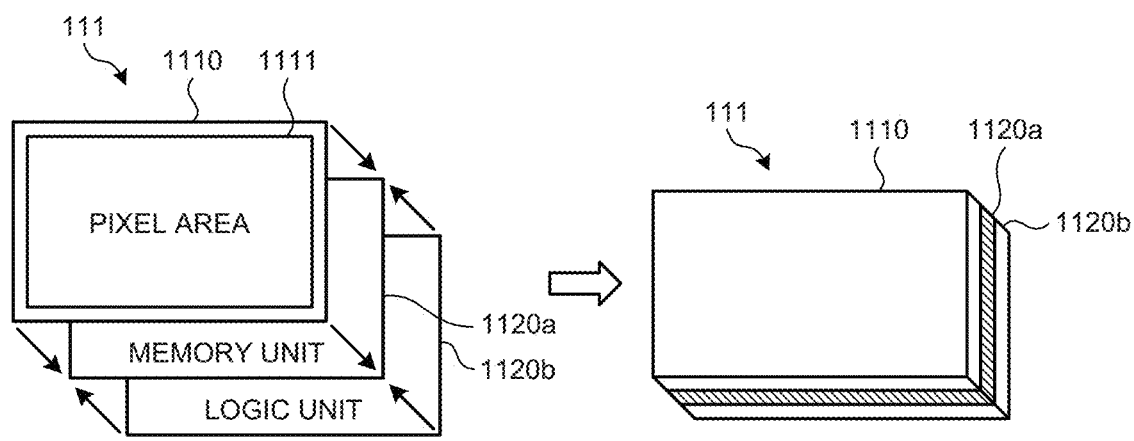
FIG. 11 is a diagram illustrating an example of a sensor unit formed of a laminated CIS having a layer structure applicable to each embodiment.

The laminated structure of the sensor unit 111 will be schematically described with reference to FIGS. 10 and 11.

As an example, the sensor unit 111 can be formed by a two-layer structure in which semiconductor chips are laminated in two layers. FIG. 10 is a diagram illustrating an example of the sensor unit 111 formed by a laminated complementary metal oxide semiconductor image sensor (CIS) having the two-layer structure applicable to each embodiment. In the structure of FIG. 10, the pixel area 1111 is formed in the first-layer semiconductor chip which is the sensor chip 1110, and a circuit unit is formed in the second-layer semiconductor chip which is the circuit chip 1120.

The circuit unit includes, for example, the vertical drive circuit 1121, the column signal processing unit 1122, the timing control circuit 1123, and the output circuit 1124. Incidentally, the sensor chip 1110 may include the pixel area 1111 and, for example, the vertical drive circuit 1121. As illustrated on the right side of FIG. 10, the sensor chip 1110 and the circuit chip 1120 are bonded together while being in electrical contact with each other, so that the sensor unit 111 is configured as one solid-state imaging element.

As another example, the sensor unit 111 can be formed by a three-layer structure in which semiconductor chips are laminated in three layers. FIG. 11 is a diagram illustrating an example of the sensor unit 111 formed of a laminated CIS having the three-layer structure applicable to each embodiment. In the structure of FIG. 11, the pixel area 1111 is formed in the first-layer semiconductor chip which is the sensor chip 1110. Further, the above-described circuit chip 1120 is formed to be divided into a first circuit chip 1120a formed as the second-layer semiconductor chip and a second circuit chip 1120b formed as the third-layer semiconductor chip. As illustrated on the right side of FIG. 11, the sensor chip 1110, the first circuit chip 1120a, and the second circuit chip 1120b are bonded together while being in electrical contact with each other, so that the sensor unit 111 is configured as one solid-state imaging element.

Example of Distance Measuring Device According to Existing Technology

Figure 12:
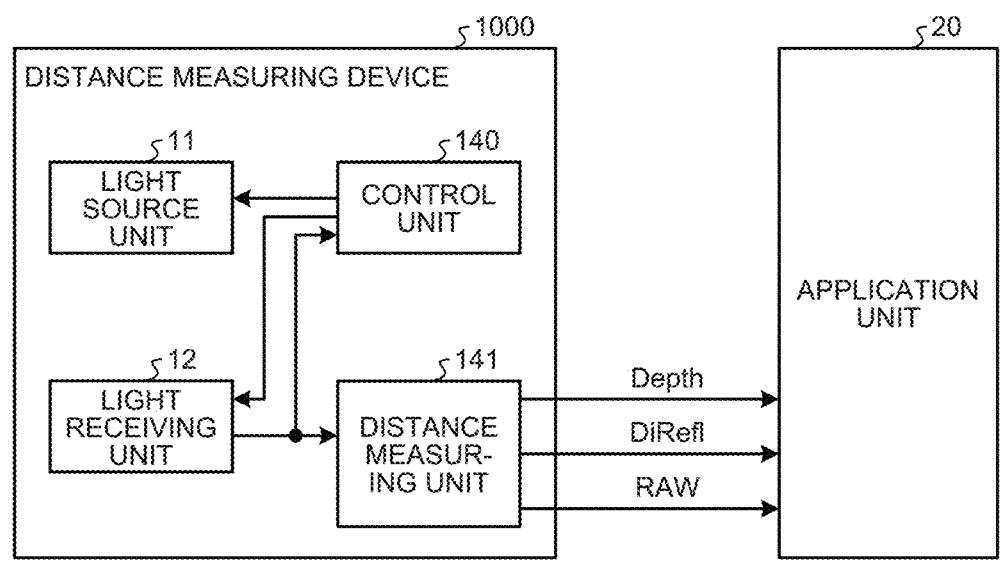
FIG. 12 is a functional block diagram illustrating one example of functions of the distance measuring device according to an existing technology.

Next, processing by a distance measuring device according to an existing technology will be described. FIG. 12 is a functional block diagram illustrating one example of functions of the distance measuring device according to the existing technology. In FIG. 12, the distance measuring device 1000 includes the light source unit 11, the light receiving unit 12, a control unit 140, and a distance measuring unit 141.

The control unit 140 generates a light source control signal and supplies the light source control signal to the light source unit 11. The light source control signal includes, for example, information that specifies a duty in PWM modulation, intensity of light emitted by the light source unit 11, light emission timing, and the like. The light source unit 11 emits the emission light 30 (see FIG. 1) modulated by the PWM in accordance with the light source control signal supplied from the control unit 140. Further, the control unit 140 generates an exposure control signal and supplies the signal to the light receiving unit 12. The exposure control signal includes information for controlling the light receiving unit 12 to perform exposure with an exposure length according to the duty of the light source unit 11 in each of different phases. Further, the exposure control signal further includes information for controlling the exposure amount in the light receiving unit 12.

The pixel signal of each phase output from the light receiving unit 12 is supplied to the distance measuring unit 141. The distance measuring unit 141 calculates the distance information Depth, the directly reflected light information DiRefl, and the RAW image information RAW by calculating the above-described equations (1) to (4), (6), and (7) on the basis of the pixel signal of each phase supplied from the light receiving unit 12. The equation (5) may be used instead of the equation (7). The distance measuring unit 141 passes the calculated distance information Depth, directly reflected light information DiRefl, and RAW image information RAW to, for example, the application unit 20.

Herein, the above-described control unit 140 generates a control signal for controlling the exposure amount in the light receiving unit 12 on the basis of each pixel signal of each phase (for example, the phases of 0°, 90°, 180° and 270°) supplied from the light receiving unit 12. The control signal generated by the control unit 140 is used to enable the distance measuring unit 141 to appropriately calculate the distance information Depth regardless of the scene to be captured. For example, the control unit 140 generates a control signal to adjust each light amount value based on the pixel signal of each phase to a value within an appropriate range.

That is, more specifically, referring to the above-described equations (1) and (2), there is a possibility that the differences I and Q cannot be appropriately calculated in a case where one or more pixel signals among the pixel signals corresponding to the respective phases are saturated or at a level equal to or lower than a predetermined level. In this case, the reliability of the distance information Depth calculated on the basis of the differences I and Q in the distance measuring unit 141 is also low.

Therefore, the control unit 140 obtains a control signal for controlling each light amount value based on each pixel signal of each phase to a value within an appropriate range. On the basis of the obtained control signal, the control unit 140 controls the gain and the exposure time by the light receiving unit 12 and the duty and intensity of light emission by the light source unit 11 to adjust the amount of the light received by the light receiving unit 12 to be appropriate.

As an example, in a case where the reflectance of the measurement object 31 is low or a case where the distance indicated by the distance information Depth calculated by the distance measuring unit 141 is equal to or more than a predetermined value, the S/N of the calculated distance information Depth becomes low, and the accuracy of the distance information Depth decreases. In this case, in order to maintain the S/N of the distance information Depth calculated by the distance measuring unit 141, the control unit 140 generates a control signal for controlling the light receiving unit 12 such that the exposure time by the light receiving unit 12 becomes long.

The control unit 140 stores the generated control signal in a register or the like. The control unit 140 executes the light emission by the light source unit 11 and the light reception by the light receiving unit 12 for each frame of a predetermined cycle. The control unit 140 performs processing for one frame on the basis of the control information stored in the register, obtains a control signal on the basis of a result of the processing, and updates the control signal stored in the register.

Figure 13:
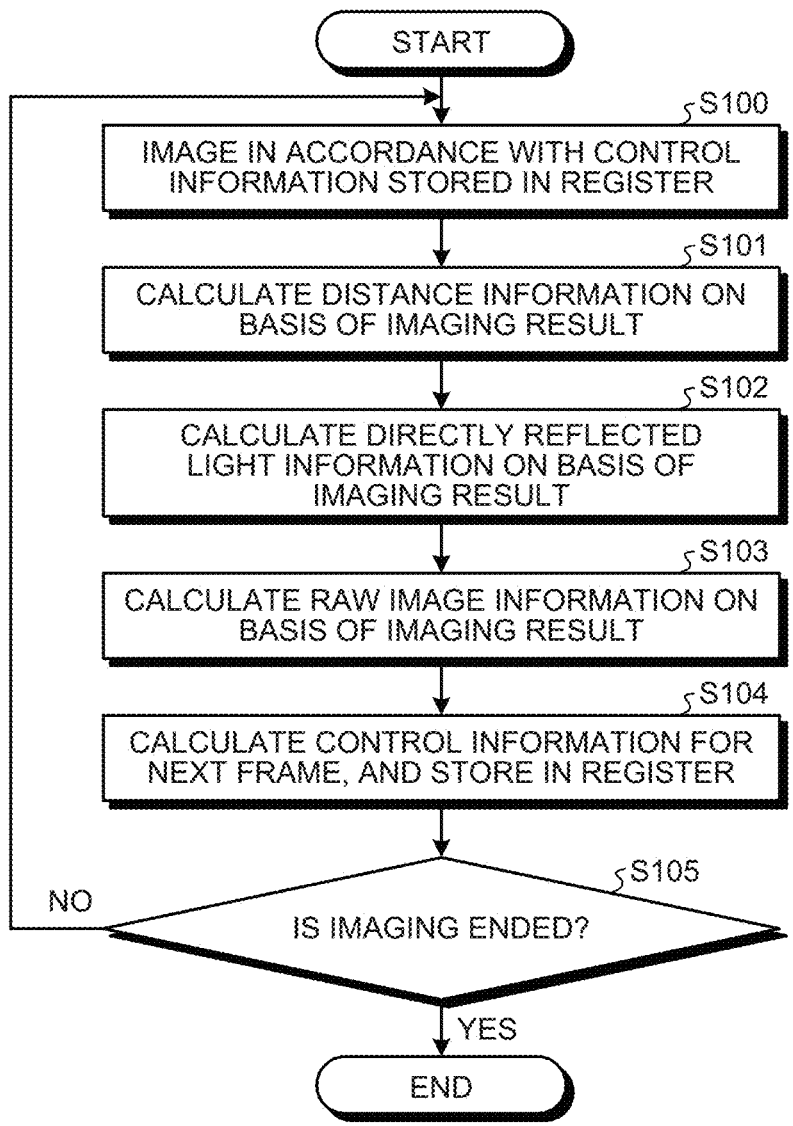
FIG. 13 is a flowchart illustrating one example of processing in the distance measuring device according to the existing technology.

FIG. 13 is a flowchart illustrating one example of processing in the distance measuring device 1000 according to the existing technology. For example, when an imaging start instruction instructing to start imaging (distance measurement) is passed from the application unit 20 to the distance measuring device 1000, the processing according to the flowchart in FIG. 13 is started.

In step S100, the distance measuring device 1000 causes the control unit 140 to control the light source unit 11 and the light receiving unit 12 on the basis of the control signal stored in the register to perform imaging. The pixel signal of each phase obtained by the imaging is passed from the light receiving unit 12 to the control unit 140 and the distance measuring unit 141.

In the next step S101, the distance measuring device 1000 causes the distance measuring unit 141 to calculate the distance information Depth on the basis of the imaging result obtained by the imaging in step S100. More specifically, the distance measuring unit 141 calculates the distance information Depth by performing the calculation of the above-described equations (1) to (4) on the basis of each pixel signal of each phase obtained by imaging and supplied from the light receiving unit 12. The distance measuring device 1000 outputs the distance information Depth calculated by the distance measuring unit 141 to, for example, the application unit 20.

In the next step S102, the distance measuring device 1000 causes the distance measuring unit 141 to calculate the directly reflected light information DiRefl on the basis of the imaging result obtained by the imaging in step S100. More specifically, the distance measuring unit 141 calculates the directly reflected light information DiRefl by performing the calculation of the above-described equation (7) or (5) on the basis of the differences I and Q obtained at the time of calculating the distance information Depth in step S101. The distance measuring device 1000 outputs the directly reflected light information DiRefl calculated by the distance measuring unit 141 to, for example, the application unit 20.

In the next step S103, the distance measuring device 1000 causes the distance measuring unit 141 to calculate the RAW image information RAW on the basis of the imaging result obtained by the imaging in step S100. More specifically, the distance measuring unit 141 calculates the RAW image information RAW by performing the calculation of the above-described equation (6) on the basis of each pixel signal of each phase acquired by the imaging in step S100. The distance measuring device 1000 outputs the RAW image information RAW calculated by the distance measuring unit 141 to, for example, the application unit 20.

In the next step S104, the distance measuring device 1000 causes the control unit 140 to obtain a control signal for controlling the light source unit 11 and the light receiving unit 12 on the basis of each pixel signal of each phase obtained by the imaging in step S100. The control unit 140 stores the obtained control signal in the register or the like.

In the next step S105, the distance measuring device 1000 determines whether or not imaging is ended. For example, in a case where the distance measuring device 1000 receives an imaging end instruction instructing end of imaging from the application unit 20, the distance measuring device determines that the imaging is ended (step S105, "Yes"). In this case, the distance measuring device 1000 ends a series of processing according to the flowchart of FIG. 13.

On the other hand, in a case where the distance measuring device 1000 does not receive the imaging end instruction from the application unit 20 and determines that the imaging is not ended (step S105, "No"), the processing returns to step S100. The processing of steps S100 to S105 is repeated, for example, in units of one frame.

Herein, the directly reflected light information DiRefl and the RAW image information RAW generated by the distance measuring unit 141 will be considered. When the gain and the exposure time by the light receiving unit 12 and the duty and intensity of the light emission by the light source unit 11 change on the basis of the above-described control signal, the signal values of the directly reflected light information DiRefl and the RAW image information RAW generated by the distance measuring unit 141 change.

On the other hand, the directly reflected light information DiRefl and the RAW image information RAW generated by the distance measuring unit 141 can be used for various purposes in addition to the distance measurement. For example, it is conceivable to use the directly reflected light information DiRefl and the RAW image information RAW for improving the accuracy of the distance information Depth. Further, it is also conceivable to apply the directly reflected light information DiRefl and the RAW image information RAW to face recognition, simultaneous localization and mapping (SLAM), or the like. Further, it is also conceivable that an image from a viewpoint as an indirect ToF sensor is important. Furthermore, it is also conceivable to use the directly reflected light information DiRefl and the RAW image information RAW when creating a composite image from an image captured by a multi-view camera in a case where the distance measuring device 1000 is applied to a smartphone and the multi-view camera is mounted on the smartphone.

As described above, in a case where the directly reflected light information DiRefl and the RAW image information RAW are secondarily used for calculation of the distance information Depth, it is not preferable that the signal values of the directly reflected light information DiRefl and the RAW image information RAW vary according to the control signal for calculation of the distance information Depth.

In the present disclosure, an adjustment value is generated according to a control signal generated such that the distance information Depth is appropriately calculated, and the scale (signal level) of the directly reflected light information DiRefl or the RAW image information RAW is adjusted on the basis of the adjustment value. As a result, even in a case where the pixel signal output from the light receiving unit 12 is controlled to appropriately calculate the distance information Depth, the signal value of the directly reflected light information DiRefl or the RAW image information RAW can be made stable.

First Embodiment

Figure 14:
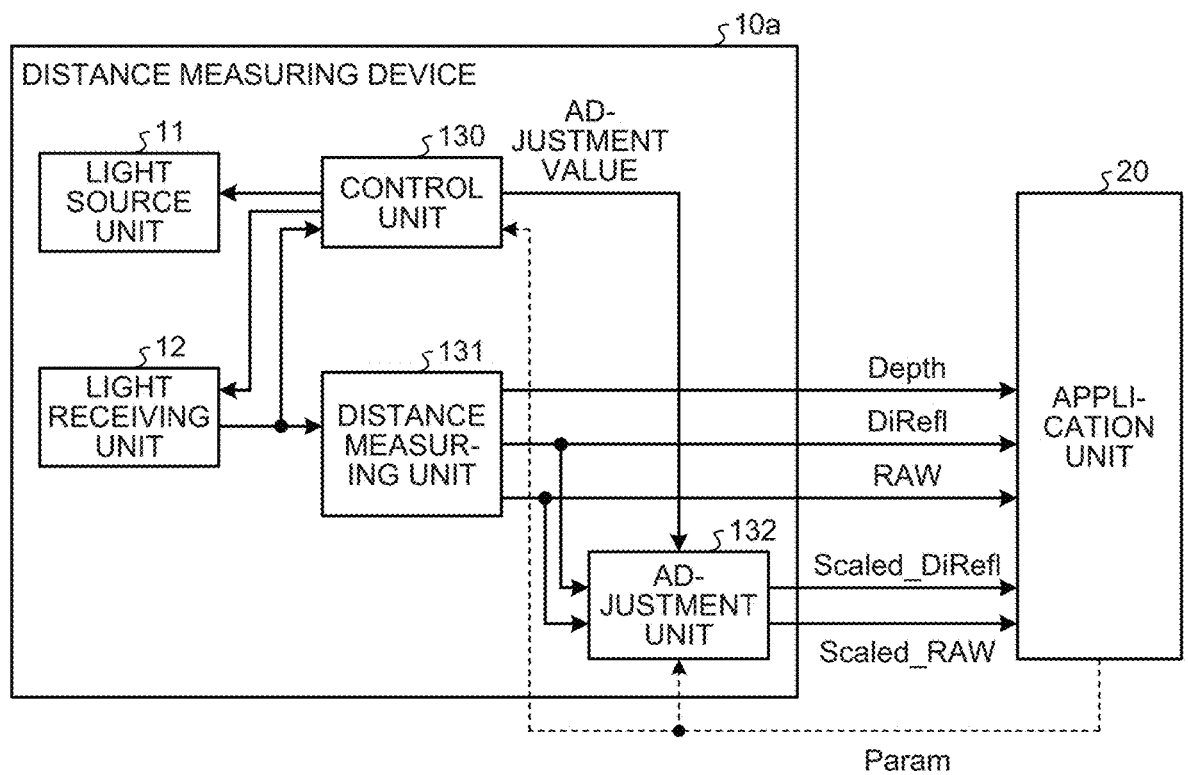
FIG. 14 is a functional block diagram illustrating one example of functions of a distance measuring device according to a first embodiment.

Next, a first embodiment of the present disclosure will be described. FIG. 14 is a functional block diagram illustrating one example of functions of a distance measuring device according to the first embodiment. In FIG. 14, a distance measuring device 10*a* includes the light source unit 11, the light receiving unit 12, a control unit 130, a distance measuring unit 131, and an adjustment unit 132. Among the light source unit 11, the light receiving unit 12, the control unit 130, the distance measuring unit 131, and the adjustment unit 132, the control unit 130, the distance measuring unit 131, and the adjustment unit 132 are configured by, for example, operating a predetermined program on the CPU 100 (see FIG. 7). The present invention is not limited thereto, and some or all of the control unit 130, the distance measuring unit 131, and the adjustment unit 132 may be configured by hardware circuits that operate in cooperation with each other.

Incidentally, in the following description, for the sake of explanation, it is assumed that acquisition of each light amount value and calculation of each piece of information at each phase of 0°, 90°, 180°, and 270° in the light receiving unit 12 are executed by the one-tap method described with reference to FIG. 5A. However, in practice, when the four-phase/two-tap method illustrated in FIG. 5B is applied to the acquisition of each light amount value and the calculation of each piece of information at each phase, it is possible to improve the S/N ratios of the calculated distance information Depth, directly reflected light information DiRefl, and RAW image information RAW, which is preferable.

The control unit 130 generates a light source control signal for controlling driving of the light source unit 11 and an exposure control signal for controlling exposure in the light receiving unit 12. The control unit 130 stores the generated control signals (the light source control signal and the exposure control signal) in the register or the like.

Here, a parameter Param is supplied from the application unit 20 to the control unit 130. The parameter Param includes, for example, a value indicating an operation mode of the application unit 20. As an operation mode of the application unit 20, an operation mode of an authentication system such as a mode in which face authentication is performed on the basis of the pixel signal output from the light receiving unit 12 and a mode in which person authentication is performed on the basis of the pixel signal can be considered. Further, as the operation mode of the application unit 20, an operation mode of displaying an image based on the pixel signal can be also considered. Further, for example, the face authentication mode can include a three-dimensional face authentication mode using three-dimensional information based on the distance information Depth and a two-dimensional face authentication mode using two-dimensional information based on the directly reflected light information DiRefl.

The control unit 130 generates the light source control signal and the exposure control signal described above on the basis of the parameter Param supplied from the application unit 20 such that the pixel signal output from the light receiving unit 12 is appropriate for the operation mode of the application unit 20.

For example, in a case where the parameter Param indicates the three-dimensional face authentication mode, the control unit 130 generates the light source control signal and the exposure control signal such that the distance information Depth calculated by the distance measuring unit 131 is appropriate for face authentication in the three-dimensional face authentication mode. Incidentally, the parameter Param can include, for example, parameters for the control unit 130 to generate the light source control signal and the exposure control signal.

The control unit 130 further generates an adjustment value for adjusting the scale of the directly reflected light information DiRefl and the RAW image information RAW on the basis of the light source control signal and the exposure control signal. The control unit 130 supplies the generated adjustment value to the adjustment unit 132 and stores the adjustment value in the register or the like.

The distance measuring unit 131 has a function corresponding to the distance measuring unit 141 described with reference to FIG. 12. In other words, the distance measuring unit 131 calculates the distance information Depth, the directly reflected light information DiRefl, and the RAW image information RAW by calculating the above-described equations (1) to (4), (6), and (7) on the basis of the pixel signal of each phase supplied from the light receiving unit 12. The distance information Depth, the directly reflected light information DiRefl, and the RAW image information RAW output from the distance measuring unit 131 are supplied to, for example, the application unit 20. Further, the directly reflected light information DiRefl and the RAW image information RAW output from the distance measuring unit 131 are also supplied to the adjustment unit 132.

The adjustment unit 132 adjusts the scales of the directly reflected light information DiRefl and the RAW image information RAW supplied from the distance measuring unit 131 on the basis of the adjustment value supplied from the control unit 130. The adjustment unit 132 passes the directly reflected light information DiRefl, and directly reflected light information Scaled_DiRefl and RAW image information Scaled_RAW obtained by adjusting the scale of the RAW image information RAW to the application unit 20.

Details of Configuration According to First Embodiment

Figure 15:
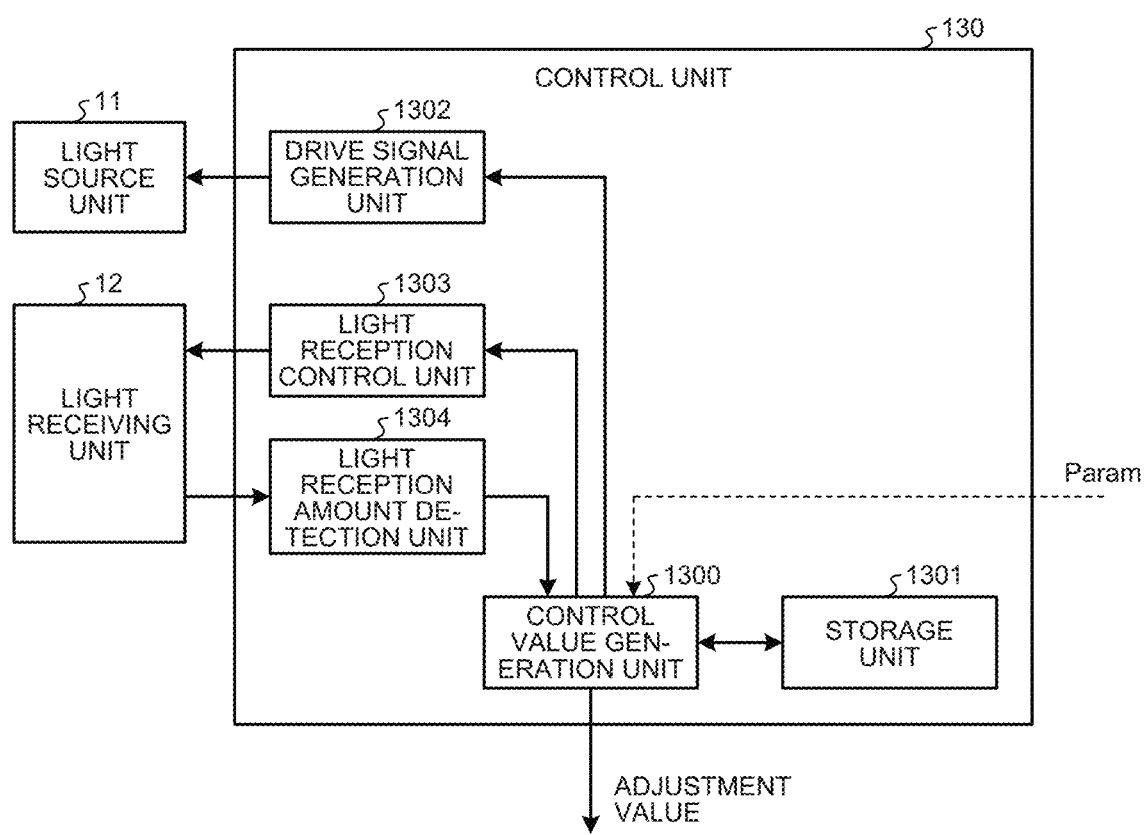
FIG. 15 is a functional block diagram illustrating one example of functions of a control unit applicable to the first embodiment.

FIG. 15 is a functional block diagram illustrating one example of functions of the control unit 130 applicable to the first embodiment. In FIG. 15, the control unit 130 includes a control value generation unit 1300, a storage unit 1301, a drive signal generation unit 1302, a light reception control unit 1303, and a light reception amount detection unit 1304.

In accordance with the light source control signal generated by the control value generation unit 1300, the drive signal generation unit 1302 generates a drive signal modulated by the PWM with a predetermined duty and controlled to a predetermined level. The drive signal generation unit 1302 supplies the generated drive signal to the light source unit 11. The light source unit 11 emits light on the basis of the supplied drive signal and emits the emission light 30 modulated by the PWM with a predetermined duty.

The light reception control unit 1303 controls the exposure period and the gain in the light receiving unit 12 according to the exposure control signal generated by the control value generation unit 1300. The light receiving unit 12 is controlled to have an exposure period and a gain by the light reception control unit 1303, and outputs the pixel signal corresponding to the light received during the exposure period.

The light reception amount detection unit 1304 is supplied with the pixel signal output from the light receiving unit 12. Herein, the pixel signal output by the light receiving unit 12 is each pixel signal having each phase of 0°, 90°, 180°, and 270°. The light reception amount detection unit 1304 obtains light amount values $C_0$, $C_{90}$, $C_{180}$, and $C_{270}$ of the light received in each phase on the basis of the pixel signal supplied from the light receiving unit 12. The light reception amount detection unit 1304 passes the obtained light amount values $C_0$, $C_{90}$, $C_{180}$, and $C_{270}$ to the control value generation unit 1300.

The control value generation unit 1300 generates a light source control signal and an exposure control signal on the basis of the light amount values $C_0$, $C_{90}$, $C_{180}$, and $C_{270}$ passed from the light reception amount detection unit 1304. The present invention is not limited thereto, and the control value generation unit 1300 may generate at least one of the light source control signal and the exposure control signal. For example, in a case where the light amount value of at least one of the light amount values $C_0$, $C_{90}$, $C_{180}$, and $C_{270}$ is a value outside a predetermined range, the control value generation unit 1300 generates one or both of the light source control signal and the exposure control signal such that the light amount value becomes a value within the predetermined range.

For example, the control value generation unit 1300 generates, for the light source unit 11, a light source control signal for controlling the light amount of the emission light 30 emitted by the light source unit 11. By controlling the amount of the emission light 30 emitted from the light source unit 11, the amount of the reflected light 32 received by the light receiving unit 12 can be controlled. Further, the control value generation unit 1300 generates, for the light receiving unit 12, an exposure control signal for controlling the amount of light received during the exposure period.

The storage unit 1301 is, for example, a register, and stores the light source control signal and the exposure control signal generated by the control value generation unit 1300. The control value generation unit 1300 can supply the light source control signal and the exposure control signal stored in the storage unit 1301 to the drive signal generation unit 1302 and the light reception control unit 1303, respectively.

Figure 16A:
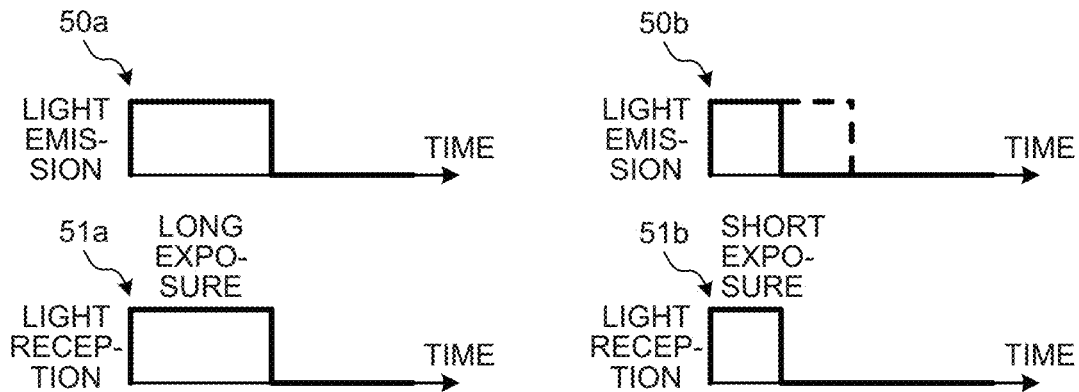
FIG. 16A is a diagram for schematically explaining a control signal generated by a control value generation unit applicable to each embodiment.
Figure 16B:
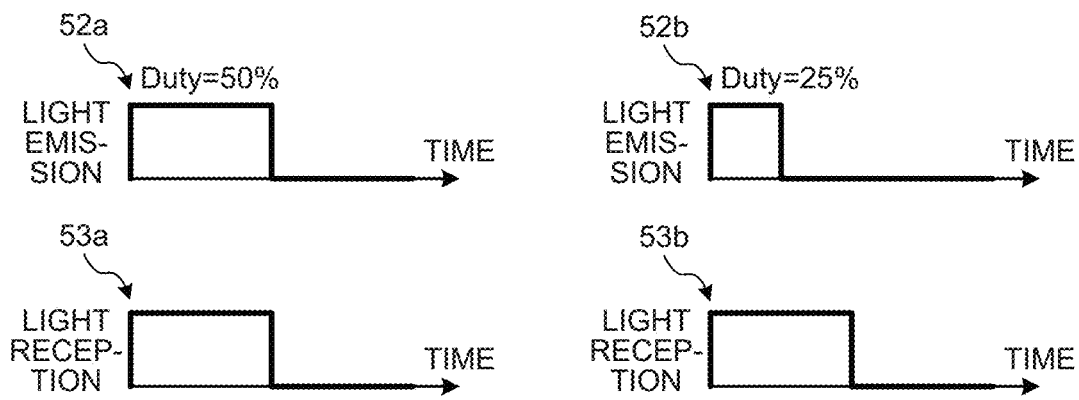
FIG. 16B is a diagram for schematically explaining the control signal generated by the control value generation unit applicable to each embodiment.
Figure 16C:
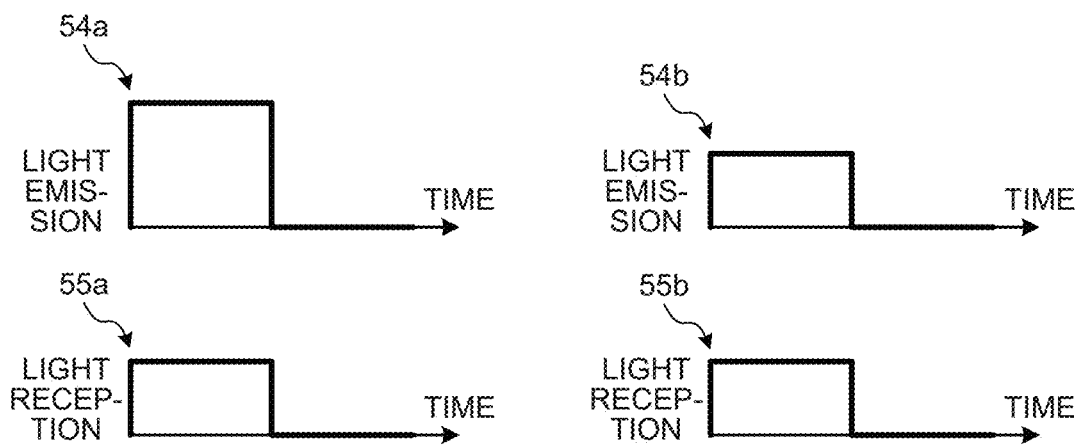
FIG. 16C is a diagram for schematically explaining the control signal generated by the control value generation unit applicable to each embodiment.

FIGS. 16A, 16B, and 16C are diagrams for schematically explaining the control signal generated by the control value generation unit 1300 applicable to each embodiment.

FIG. 16A is a diagram illustrating a first example of control by the control value generation unit 1300. In the first example, the control value generation unit 1300 controls the light receiving unit 12 by the exposure control signal. In FIG. 16A, for example, charts 50a and 51a illustrate examples of the light emission of the light source unit 11 and the exposure period of the light receiving unit 12 in a default state, respectively. More specifically, the chart 50a illustrates an example of one cycle of the light emission of the light source unit 11 in the default state. Further, the chart 51a illustrates an example of the exposure period (long exposure) in the light receiving unit 12 in the default state corresponding to the light emission cycle of the light source unit 11.

For example, in a case where the amount of the light received by the light receiving unit 12 during the exposure period is controlled to a half of that in the default state, as illustrated in the chart 51b of FIG. 16A, the control value generation unit 1300 generates an exposure control signal such that the exposure period of the light receiving unit 12 is a half of the exposure period in the default state. The control value generation unit 1300 passes the generated exposure control signal to the light reception control unit 1303. By this exposure control signal, the exposure time of the light receiving unit 12 becomes short exposure which is a half of the above-described long exposure, and the light reception amount decreases with respect to the default state.

In this case, as indicated by a solid line in chart 50b of FIG. 16A, the control value generation unit 1300 generates a light source control signal for setting the duty of the light emission of the light source unit 11 to a half of that in the default state, and synchronizes the period during which the light source unit 11 emits light with the exposure period of the light receiving unit 12. The present invention is not limited thereto, and the duty of the light emission of the light source unit 11 may remain in the default state as indicated by a dotted line in the chart 50b.

FIG. 16B is a diagram illustrating a second example of the control by the control value generation unit 1300. In the second example, the control value generation unit 1300 controls the light source unit 11 by the light source control signal. In FIG. 16B, for example, charts 52a and 53a illustrate examples of the light emission of the light source unit 11 and the exposure period of the light receiving unit 12 in the default state, respectively. More specifically, the chart 52a illustrates an example of one cycle of the light emission of the light source unit 11 in the default state. In the default state, the light source unit 11 blinks and emits light according to duty=50%. Further, the chart 53a illustrates an example of the exposure period in the light receiving unit 12 in the default state corresponding to the duty of the light source unit 11.

In the second example, for example, in a case where the amount of the light received by the light receiving unit 12 during the exposure period is controlled to a half of that in the default state, the control value generation unit 1300 generates a light source control signal for setting the duty of the light emission in the light source unit 11 to 25% of a half of that in the default state as illustrated in the chart 52b in FIG. 16B. The control value generation unit 1300 passes the generated light source control signal to the drive signal generation unit 1302. The exposure period of the light receiving unit 12 remains in the default state as illustrated in the chart 53b. By this light source control signal, the time during which the light source unit 11 emits light in one cycle of a PWM waveform becomes a half of that in the default state, and the light reception amount in the light receiving unit 12 decreases with respect to the default state.

FIG. 16C is a diagram illustrating a third example of the control by the control value generation unit 1300. In the third example, the control value generation unit 1300 controls the light source unit 11 by the light source control signal. In FIG. 16C, for example, charts 54a and 55a illustrate examples of the light emission of the light source unit 11 and the exposure period of the light receiving unit 12 in the default state, respectively. More specifically, the chart 54a illustrates an example of one cycle of the light emission of the light source unit 11 in the default state. Further, the chart 55a illustrates an example of the exposure period in the light receiving unit 12 in the default state corresponding to the light emission cycle of the light source unit 11.

In the third example, for example, in a case where the amount of the light received by the light receiving unit 12 during the exposure period is controlled to a half of that in the default state, the control value generation unit 1300 generates a light source control signal for setting the light emission intensity in the light source unit 11 to a half of that in the default state as illustrated in the chart 54b of FIG. 16C. The control value generation unit 1300 passes the generated light source control signal to the drive signal generation unit 1302. The exposure period of the light receiving unit 12 remains in the default state as illustrated in the chart 55b. By this light source control signal, one cycle of light emission amount by the light source unit 11 becomes a half time of that in the default state, and the light reception amount in the light receiving unit 12 decreases with respect to the default state.

On the basis of each of the light amount values $C_0$, $C_{90}$, $C_{180}$, and $C_{270}$ passed from the light reception amount detection unit 1304, the control value generation unit 1300 generates a control signal for controlling the light reception amount in the light receiving unit 12 by any one of the first to third examples described above or a combination of two or more of the first to third examples. As described above, the control signal generated here is at least one of the exposure control signal and the light source control signal. The control value generation unit 1300 stores the generated control signal in the storage unit 1301.

Incidentally, the control value generation unit 1300 can also control the gain in the light receiving unit 12, for example, in addition to the first to third examples described with reference to FIGS. 16A, 16B, and 16C. By controlling the gain in the light receiving unit 12, the level of the pixel signal output from the light receiving unit 12 is controlled. The control value generation unit 1300 generates a gain control signal for controlling a gain in the light receiving unit 12 and passes the gain control signal to the light reception control unit 1303. The light reception control unit 1303 controls, for example, an output gain of the output circuit 1124 (see FIG. 8) in the light receiving unit 12 according to the gain control signal passed from the control value generation unit 1300.

The control value generation unit 1300 generates an adjustment value for adjusting the scale (signal level) of the directly reflected light information DiRefl and the RAW image information RAW on the basis of the generated control signal. The control value generation unit 1300 outputs the generated adjustment value from the control unit 130.

Figure 17:
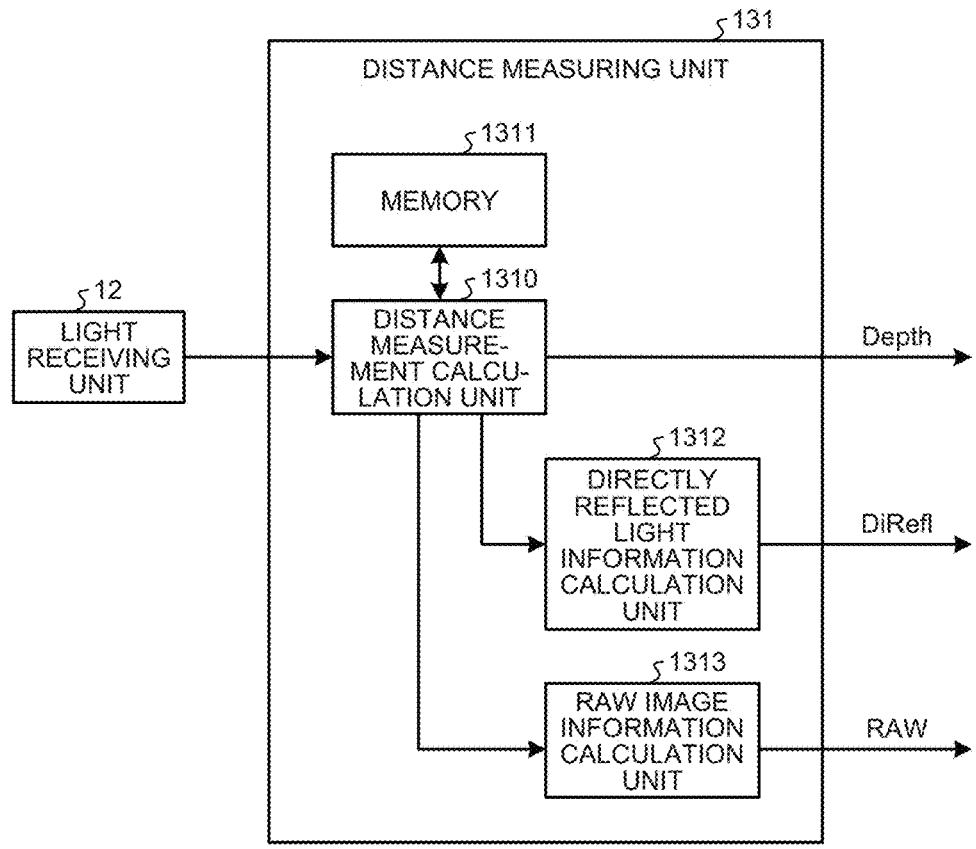
FIG. 17 is a functional block diagram illustrating one example of functions of a distance measuring unit applicable to the first embodiment.

FIG. 17 is a functional block diagram illustrating one example of functions of the distance measuring unit 131 applicable to the first embodiment. In FIG. 17, the distance measuring unit 131 includes a distance measurement calculation unit 1310, a memory 1311, a directly reflected light information calculation unit 1312, and a RAW image information calculation unit 1313.

Each pixel signal of each phase output from the light receiving unit 12 is supplied to the distance measurement calculation unit 1310. The distance measurement calculation unit 1310 obtains the light amount values $C_0$, $C_{90}$, $C_{180}$, and $C_{270}$ of the light received in each phase on the basis of the pixel signal supplied from the light receiving unit 12. The distance measurement calculation unit 1310 stores the obtained light amount values $C_0$, $C_{90}$, $C_{180}$, and $C_{270}$ in the memory 1311.

When all the light amount values $C_0$, $C_{90}$, $C_{180}$, and $C_{270}$ are stored in the memory 1311, the distance measurement calculation unit 1310 calculates the differences I and Q on the basis of the above-described equations (1) and (2). Further, the distance measurement calculation unit 1310 calculates the distance information Depth by the above-described equations (3) and (4) on the basis of the calculated differences I and Q. The distance measurement calculation unit 1310 outputs the calculated distance information Depth from the distance measuring unit 131.

The distance measurement calculation unit 1310 passes the calculated differences I and Q to the directly reflected light information calculation unit 1312. The directly reflected light information calculation unit 1312 calculates the directly reflected light information DiRefl on the basis of the above-described equation (7) using the differences I and Q passed from the distance measurement calculation unit 1310. The directly reflected light information calculation unit 1312 is not limited thereto, and may calculate the directly reflected light information DiRefl on the basis of the above-described equation (5). The directly reflected light information calculation unit 1312 outputs the calculated directly reflected light information DiRefl from the distance measuring unit 131.

Further, the distance measurement calculation unit 1310 passes the light amount values $C_0$, $C_{90}$, $C_{180}$, and $C_{270}$ stored in the memory 1311 to the RAW image information calculation unit 1313. The RAW image information calculation unit 1313 calculates the RAW image information RAW on the basis of the above-described equation (6). The RAW image information calculation unit 1313 outputs the calculated RAW image information RAW from the distance measuring unit 131.

Figure 18:
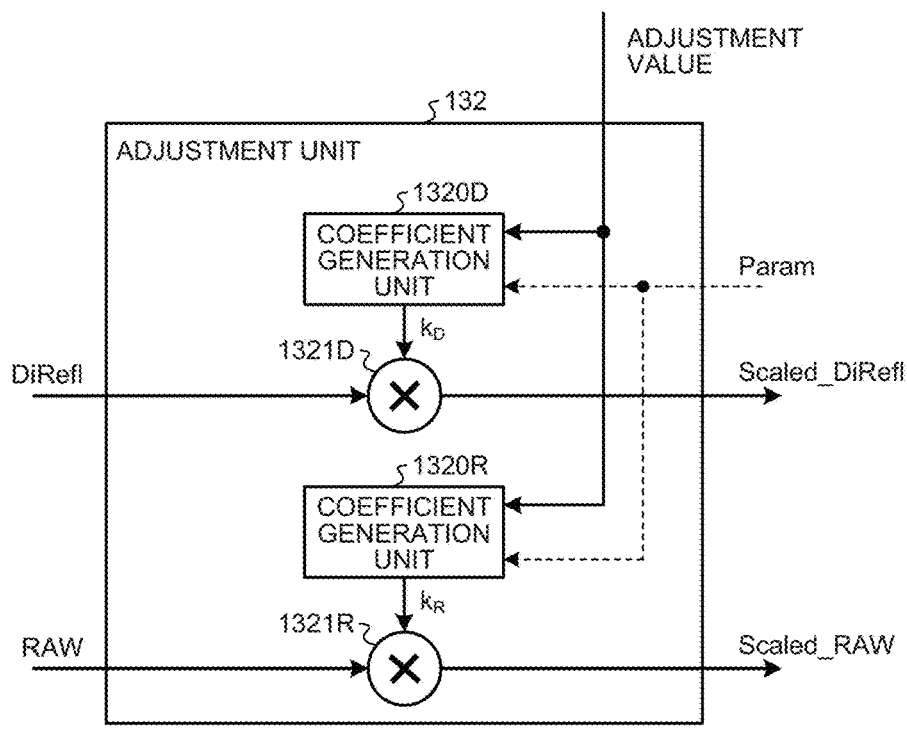
FIG. 18 is a functional block diagram illustrating one example of functions of an adjustment unit applicable to the first embodiment.

FIG. 18 is a functional block diagram illustrating one example of functions of the adjustment unit 132 applicable to the first embodiment. In FIG. 18, the adjustment unit 132 includes a coefficient generation unit 1320D and a multiplier 1321D as a configuration for adjusting the directly reflected light information DiRefl. Further, the adjustment unit 132 includes a coefficient generation unit 1320R and a multiplier 1321R as a configuration for adjusting the RAW image information RAW.

In FIG. 18, the adjustment value output from the control value generation unit 1300 and the parameter Param output from the application unit 20 are input to the coefficient generation units 1320D and 1320R, respectively.

Herein, the parameter Param further includes the directly reflected light information DiRefl requested by the application unit 20 and target information target indicating the signal level of the RAW image information RAW with respect to the information indicating the above-described operation mode. The parameter Param may include the target information target for each of the directly reflected light information DiRefl and the RAW image information RAW. Hereinafter, unless otherwise specified, the target information target corresponds to the directly reflected light information DiRefl. In this case, the target information target is, for example, a value normalized on the basis of the signal level of the directly reflected light information DiRefl in a predetermined default state.

In the configuration for adjusting the directly reflected light information DiRefl, the coefficient generation unit 1320D obtains a coefficient $k_D$ for adjusting the signal level (scale) of the directly reflected light information DiRefl on the basis of the adjustment value output from the control value generation unit 1300 and the target information target included in the parameter Param.

Herein, a scale Scale is defined by a following equation (12) on the basis of the target information target and the adjustment value.

$$\text{Scale} = \text{target/adjustment value} \qquad (12)$$

Incidentally, the adjustment value indicates a ratio of the light reception amount in a case where at least one of the light source unit 11 and the light receiving unit 12 is controlled by the control signal with respect to the light reception amount in a predetermined default state of the light receiving unit 12. For example, in the case of the example of FIG. 16B described above, since the duty of the light emission of the light source unit 11 is controlled from 50% to 25%, and the light reception amount becomes a half, the adjustment value is set to ½.

According to the equation (12), the signal level of the directly reflected light information DiRefl is scaled on the basis of the scale Scale after canceling the controlled amount of the light reception amount of the light receiving unit 12. For example, when the adjustment value=½ and the target information target=1, the scale Scale=2 and the coefficient $k_D$=2 are calculated. The coefficient generation unit 1320D inputs the calculated coefficient $k_D$ to the multiplication value input end of the multiplier 1321D.

The directly reflected light information DiRefl output from the directly reflected light information calculation unit 1312 is input to the multiplication target value input end of the multiplier 1321D. The multiplier 1321D multiplies the directly reflected light information DiRefl input to the multiplication target value input end by the coefficient $k_D$ input to the multiplication input end, and outputs the scale-adjusted directly reflected light information Scaled_DiRefl.

The configuration for adjusting the RAW image information RAW also has a function equivalent to that of the configuration for adjusting the directly reflected light information DiRefl described above. That is, the coefficient generation unit 1320R calculates the coefficient $k_R$ for adjusting the signal level of the RAW image information RAW by the above-described equation (12) on the basis of the adjustment value output from the control value generation unit 1300 and the target information target for the RAW image information RAW included in the parameter Param. The coefficient generation unit 1320R inputs the calculated coefficient $k_R$ to the multiplication value input end of the multiplier 1321R.

The RAW image information RAW output from the RAW image information calculation unit 1313 is input to the multiplication target value input end of the multiplier 1321R. The multiplier 1321R multiplies the RAW image information RAW input to the multiplication target value input end by the coefficient $k_R$ input to the multiplication input end and outputs the scaled-adjusted RAW image information Scaled_RAW.

(Example of Each Piece of Information According to First Embodiment)

Figure 19A:
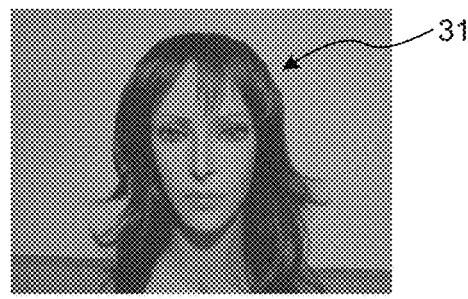
FIG. 19A is a diagram for more specifically explaining distance information, directly reflected light information, and scale-adjusted directly reflected light information.

The distance information Depth, the directly reflected light information DiRefl, and the scale-adjusted directly reflected light information Scaled_DiRefl will be described more specifically with reference to FIGS. 19A, 19B, 19C, and 19D. FIG. 19A is a view illustrating an example of the measurement object 31 captured by the light receiving unit 12. In the example of FIG. 19A, the head of a mannequin is used as the measurement object 31.

Figure 19B:
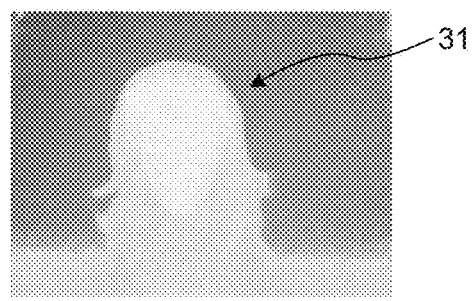
FIG. 19B is a diagram for more specifically explaining the distance information, the directly reflected light information, and the scale-adjusted directly reflected light information.

FIG. 19B is a diagram illustrating an example of the distance information Depth. In FIG. 19B, the distance information Depth is expressed as an image based on the distance information Depth corresponding to each pixel position. In the example of FIG. 19B, the distance information Depth to each portion of the measurement object 31 is expressed by the brightness of the pixel. For example, the closer the distance is, the brighter the image is expressed, and the farther the distance is, the darker the image is expressed. The face authentication in the three-dimensional face recognition mode using the three-dimensional information can be executed on the basis of the distance information Depth as illustrated in FIG. 19B.

Figure 19C:
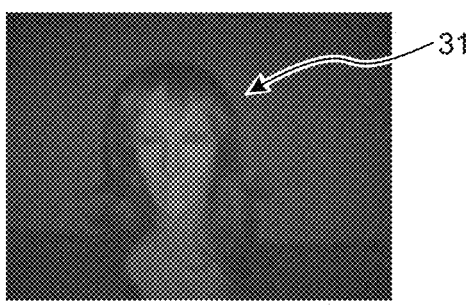
FIG. 19C is a diagram for more specifically explaining the distance information, the directly reflected light information, and the scale-adjusted directly reflected light information.

FIG. 19C is a diagram illustrating an example of the directly reflected light information DiRefl. Since the image is obtained by extracting the reflected light 32 obtained by reflecting the emission light 30 from the light source unit 11 from the measurement object 31, a portion of the measurement object 31 having a high reflectance, for example, a skin portion of the face is displayed brighter than the surroundings. Further, a fine portion (eyes, lips, eyebrows, or the like) of the head of the mannequin is unclear.

Figure 19D:
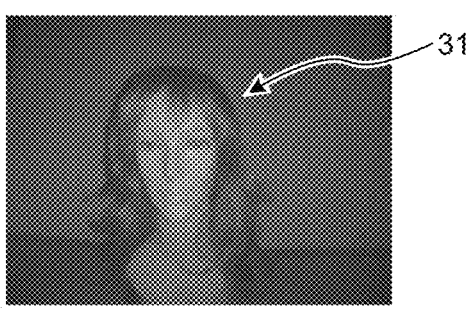
FIG. 19D is a diagram for more specifically explaining the distance information, the directly reflected light information, and the scale-adjusted directly reflected light information.

FIG. 19D is a diagram illustrating an example of the directly reflected light information Scaled_DiRefl subjected to scale adjustment according to each embodiment. A portion of the measurement object 31 having a high reflectance is displayed more clearly as compared with the example of FIG. 19C described above. For example, portions, such as eyes, lips, and eyebrows, which are unclear in the example of FIG. 19C can be more clearly recognized. For example, in the two-dimensional face authentication mode using the two-dimensional information in the face authentication, the recognition processing can be executed with higher accuracy by using the scale-adjusted directly reflected light information Scaled_DiRefl illustrated in FIG. 19D than the directly reflected light information DiRefl illustrated in FIG. 19C described above.

Processing in Distance Measuring Device According to First Embodiment

Figure 20:
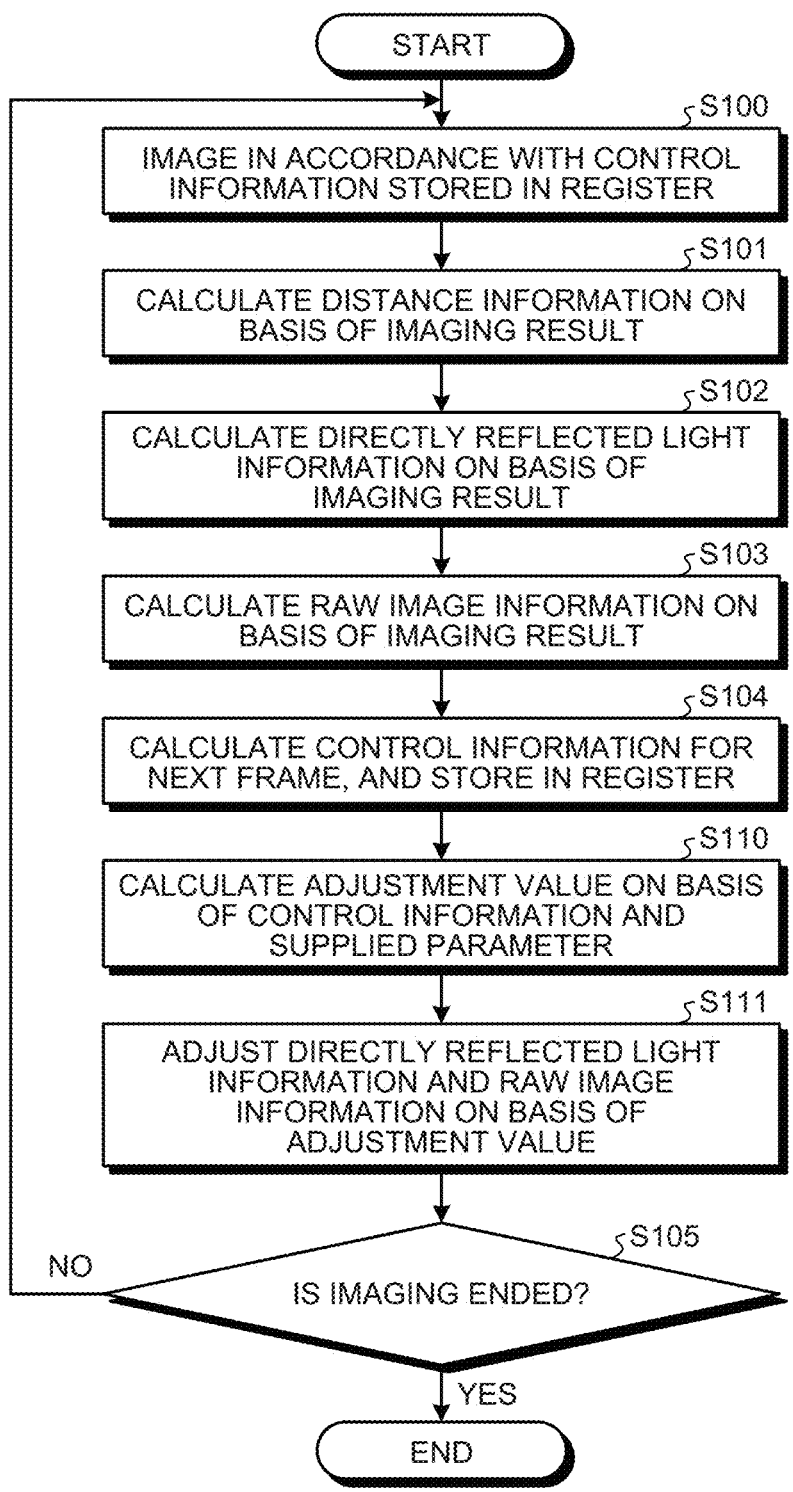
FIG. 20 is a flowchart illustrating one example of processing in the distance measuring device according to the first embodiment.

FIG. 20 is a flowchart illustrating one example of processing in the distance measuring device 10a according to the first embodiment. Similarly to the flowchart of FIG. 13, for example, when an imaging start instruction instructing to start imaging (distance measurement) is passed from the application unit 20 to the distance measuring device 10a, the processing according to the flowchart of FIG. 20 is started. At the same time, the application unit 20 passes the parameter Param including the information indicating the operation mode of the application unit 20 and the target information target for the directly reflected light information DiRefl and the RAW image information RAW to the distance measuring device 10a.

In the flowchart of FIG. 20, the processing of steps S100 to S104 is similar to the corresponding processing of FIG. 13 described above. That is, in step S100, the distance measuring device 10a causes the control unit 130 to control the light source unit 11 and the light receiving unit 12 on the basis of the control signal stored in the register to perform imaging. The pixel signal of each phase obtained by the imaging is passed from the light receiving unit 12 to the control unit 140 and the distance measuring unit 141.

In the next step S101, the distance measuring device 10a causes the distance measuring unit 131 to calculate the distance information Depth on the basis of the imaging result obtained by the imaging in step S100. The distance measuring device 10a outputs the distance information Depth calculated by the distance measuring unit 141 to, for example, the application unit 20. In the next step S102, the distance measuring device 10a causes the distance measuring unit 131 to calculate the directly reflected light information DiRefl on the basis of the imaging result obtained by the imaging in step S100. The distance measuring device 10a outputs the directly reflected light information DiRefl calculated by the distance measuring unit 131 to, for example, the application unit 20. In the next step S103, the distance measuring device 10a causes the distance measuring unit 131 to calculate the RAW image information RAW on the basis of the imaging result obtained by the imaging in step S100. The distance measuring device 10a outputs the RAW image information RAW calculated by the distance measuring unit 131 to, for example, the application unit 20.

In the next step S104, the distance measuring device 10a causes the control unit 130 to obtain control information for controlling the light source unit 11 and the light receiving unit 12 on the basis of each pixel signal of each phase obtained by the imaging in step S100. The control unit 140 stores the obtained control information in the register or the like.

In the next step S110, the distance measuring device 10a causes the control unit 130 to calculate an adjustment value for performing scale adjustment on the directly reflected light information DiRefl and the RAW image information RAW on the basis of the control information obtained in step S104 and the parameter Param passed from the application unit 20. The calculated adjustment value is passed to the adjustment unit 132.

In the next step S111, the distance measuring device 10a causes the adjustment unit 132 to adjust the directly reflected light information DiRefl calculated in step S102 and the RAW image information RAW calculated in step S103 on the basis of the adjustment value calculated in step S110, and acquire the scale-adjusted directly reflected light information Scaled_DiRefl and RAW image information Scaled_RAW. The distance measuring device 10a outputs the acquired scale-adjusted directly reflected light information Scaled_DiRefl and RAW image information Scaled_RAW to, for example, the application unit 20.

In the next step S105, the distance measuring device 10a determines whether or not the imaging is ended. For example, in a case where the distance measuring device 10a receives an imaging end instruction from the application unit 20, the distance measuring device determines that the imaging is ended (step S105, "Yes"), and ends a series of processing according to the flowchart of FIG. 20.

On the other hand, in a case where the distance measuring device 1000 does not receive the imaging end instruction from the application unit 20 and determines that the imaging is not ended (step S105, "No"), the processing returns to step S100. The processing of steps S100 to S105 including steps S110 and S111 is repeated, for example, in units of one frame.

As described above, in the first embodiment, on the basis of the control signal for controlling the amount of the light received by the light receiving unit 12 for the calculation of the distance information Depth, scale adjustment is performed on the directly reflected light information DiRefl and the RAW image information RAW calculated on the basis of the pixel signal. Therefore, even in a case where the light reception amount of the light receiving unit 12 changes in order to calculate the distance information Depth, it is possible to suppress the luminance change of the directly reflected light information DiRefl and the RAW image information RAW and output a moving image with a constant luminance based on the directly reflected light information DiRefl and the RAW image information RAW. As a result, for example, it is possible to improve convenience when the application unit 20 uses the directly reflected light information DiRefl and the RAW image information RAW.

Incidentally, in the above description, the distance measuring device 10a calculates the directly reflected light information DiRefl and the RAW image information RAW, and performs scale adjustment on the calculated directly reflected light information DiRefl and RAW image information RAW. However, this is not limited to this example. For example, the distance measuring device 10a may calculate only one of the directly reflected light information DiRefl and the RAW image information RAW and perform scale adjustment on the calculated information.

The distance measuring device 10a may calculate the directly reflected light information DiRefl and the RAW image information RAW, and the calculated distance measuring device 10a may perform scale adjustment on only one of the directly reflected light information DiRefl and the RAW image information RAW. Among the directly reflected light information DiRefl and the RAW image information RAW, information to be calculated or scaled can be included in the parameter Param and specified with respect to the distance measuring device 10a by the application unit 20, for example.

Second Embodiment

Next, a second embodiment of the present disclosure will be described. The second embodiment is an example in which one of the directly reflected light information DiRefl and the RAW image information RAW which are not subjected to scale adjustment and the directly reflected light information DiRefl_Scale and the RAW image information RAW_Scale which are subjected to scale adjustment can be selected and output to the application unit 20.

Figure 21:
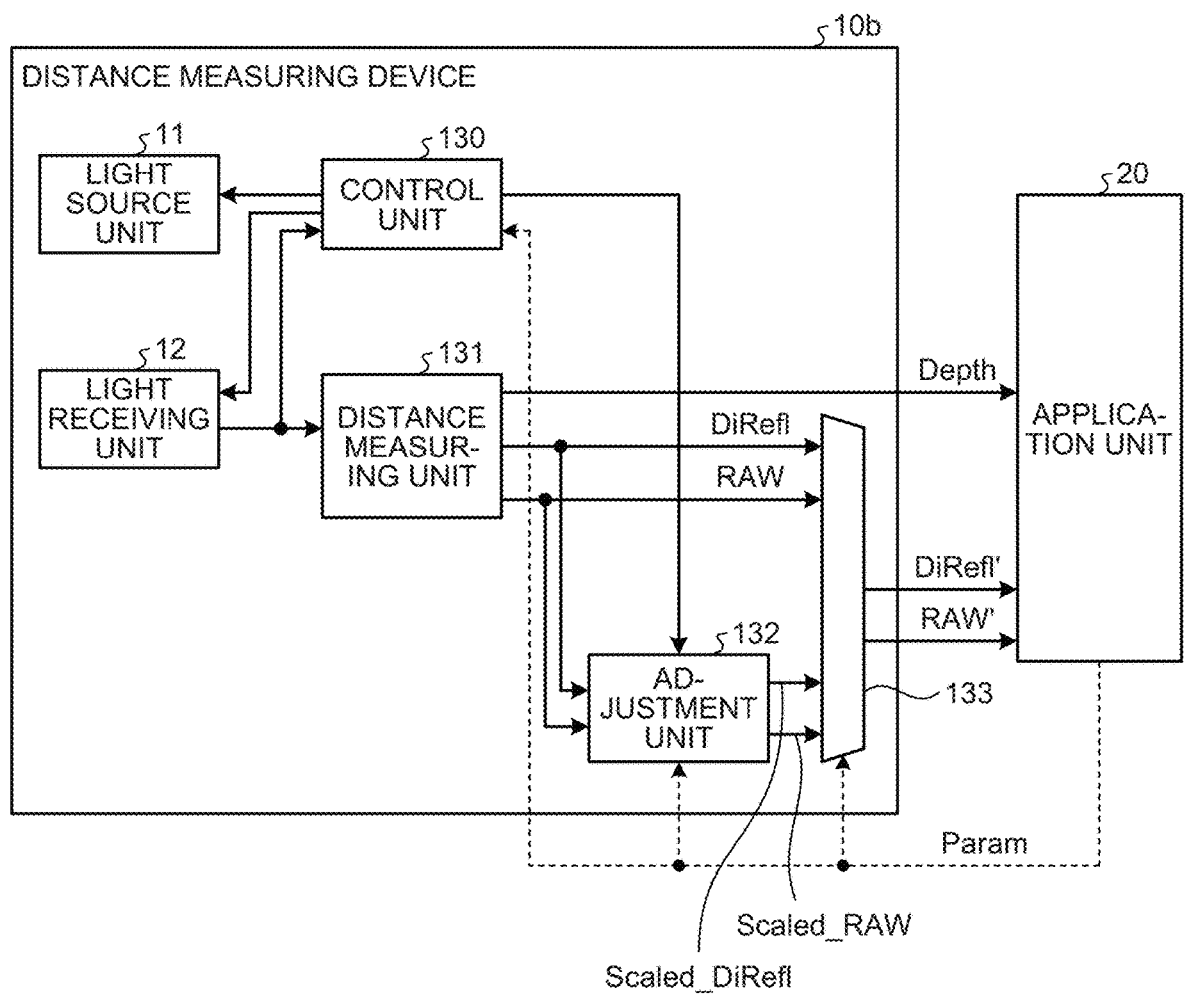
FIG. 21 is a functional block diagram illustrating one example of functions of a distance measuring device according to a second embodiment.

FIG. 21 is a functional block diagram illustrating one example of functions of a distance measuring device according to the second embodiment. In FIG. 21, in a distance measuring device 10b, a selector 133 is added to the distance measuring device 10a described with reference to FIG. 14. The selector 133 may be configured by operating a program on the CPU 100 (see FIG. 7) or may be realized by a hardware circuit.

A set of the directly reflected light information DiRefl and the RAW image information RAW output from the distance measuring unit 131 and a set of the directly reflected light information Scaled_DiRefl and the RAW image information Scaled_RAW which are output from the adjustment unit 132 and subjected to scale adjustment are input to the selector 133. The selector 133 selects one of these two sets on the basis of, for example, information which is included in the parameter Param output from the application unit 20 and indicates the operation mode of the application unit 20. The selector 133 supplies the selected set of the directly reflected light information and the RAW image information to the application unit 20 as directly reflected light information DiRefl' and RAW image information RAW', respectively.

As described above, in the distance measuring device 10b according to the second embodiment, the selector 133 selects one of the set of the directly reflected light information DiRefl and the RAW image information RAW which are not subjected to scale adjustment and the set of the directly reflected light information Scaled_DiRefl and the RAW image information Scaled_RAW which are subjected to scale adjustment, and supplies the selected set to the application unit 20. Therefore, in the distance measuring device 10b, it is possible to provide the application unit 20 with a wider variety of usage modes of the directly reflected light information and the RAW image information and to improve convenience when the application unit 20 uses the directly reflected light information DiRefl and the RAW image information RAW.

Third Embodiment

Next, a third embodiment of the present disclosure will be described. In the third embodiment, a specific subject is detected on the basis of the pixel signal output from the light receiving unit 12. Then, scale adjustment is performed on the directly reflected light information DiRefl and the RAW image information RAW in a subject area including the subject detected in the captured frame.

Figure 22:
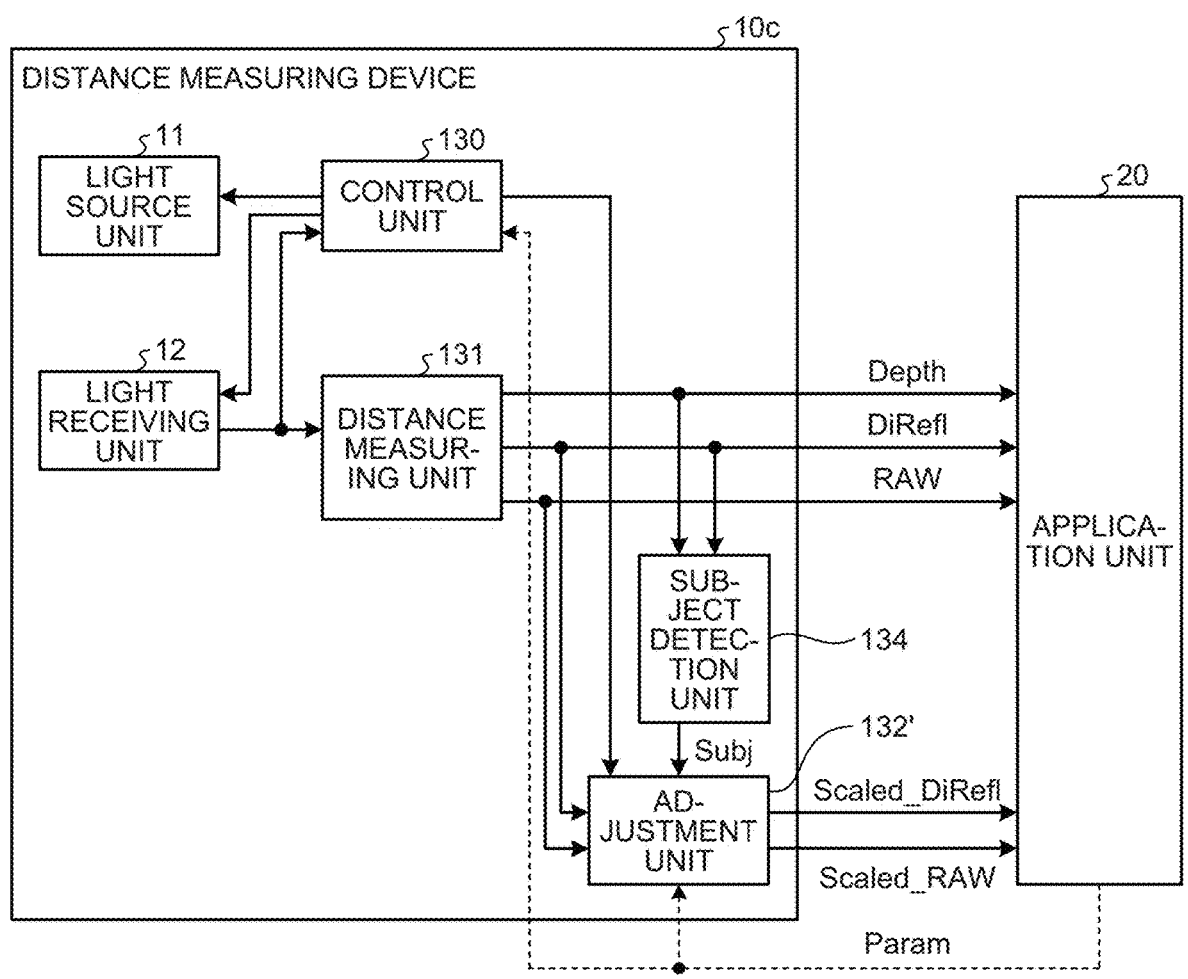
FIG. 22 is a functional block diagram illustrating one example of functions of a distance measuring device according to a third embodiment.

FIG. 22 is a functional block diagram illustrating one example of functions of a distance measuring device according to the third embodiment. In FIG. 22, in a distance measuring device 10c, a subject detection unit 134 is added to the distance measuring device 10a described with reference to FIG. 14, and the function of an adjustment unit 132' is changed. The subject detection unit 134 may be configured by operating on of a program on the CPU 100 (see FIG. 7), or may be realized by a hardware circuit.

The distance information Depth output from the distance measuring unit 131 and the directly reflected light information DiRefl are supplied to the subject detection unit 134. The subject detection unit 134 detects a specific subject (for example, a face) included in one frame on the basis of at least one of the distance information Depth and the directly reflected light information DiRefl of the frame. The subject to be detected is not limited to the face. That is, when the three-dimensional or two-dimensional shape pattern of the subject is known, another type of subject may be set as the detection target.

As an example, in the case of performing face detection, the subject detection unit 134 detects a face area in a frame on the basis of the distance information Depth (see FIG. 19B), for example, and further performs pattern matching of three-dimensional information or the like on the detected face area to detect the position and shape of each portion of the face as the three-dimensional information. Further, for example, the subject detection unit 134 performs image analysis on the directly reflected light information DiRefl to detect a face area (see FIG. 19D), and further performs pattern matching of two-dimensional information or the like to detect the position and shape of each portion of the face as the two-dimensional information. Further, the subject detection unit 134 can also perform face detection using both the face detection result based on the distance information Depth and the face detection result based on the directly reflected light information DiRefl.

The subject detection unit 134 obtains, as the subject area, an area in the frame in which the specific subject is detected, and acquires coordinate information of the subject area. As the coordinate information, for example, information indicating the position of each pixel 1112 in the pixel area 1111 can be applied with reference to FIG. 8. The subject detection unit 134 supplies the acquired coordinate information of the subject area as subject area information Subj to the adjustment unit 132'. On the basis of the subject area information Subj, the adjustment unit 132' performs scale adjustment on the information of the area indicated by the subject area information Subj in the directly reflected light information DiRefl and the RAW image information RAW supplied from the distance measuring unit 131.

Figure 23:
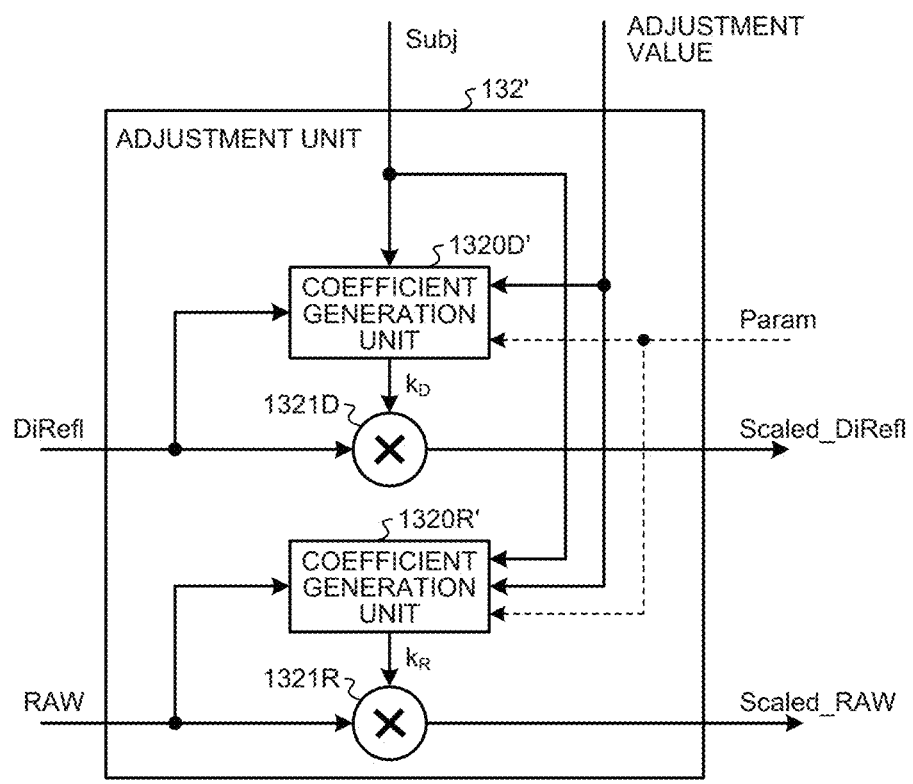
FIG. 23 is a functional block diagram illustrating one example of functions of an adjustment unit according to a third embodiment.

FIG. 23 is a functional block diagram illustrating one example of functions of the adjustment unit 132' according to the third embodiment. In FIG. 23, similarly to the adjustment unit 132 described with reference to FIG. 18, the adjustment unit 132' includes a coefficient generation unit 1320D' and the multiplier 1321D as a configuration for adjusting the directly reflected light information DiRefl. Further, the adjustment unit 132 includes a coefficient generation unit 1320R' and a multiplier 1321R as a configuration for adjusting the RAW image information RAW.

The subject area information Subj supplied from the subject detection unit 134 is input to the coefficient generation unit 1320D' and the coefficient generation unit 1320R'. For example, similarly to the description using FIG. 18, the coefficient generation unit 1320D' obtains the coefficient $k_D$ for adjusting the signal level (scale) of the directly reflected light information DiRefl by the above-described equation (12) on the basis of the adjustment value output from the control value generation unit 1300 and the target information target included in the parameter Param.

The coefficient generation unit 1320D' further receives the directly reflected light information DiRefl, and applies the obtained coefficient $k_D$ to the area indicated by the subject area information Subj in the directly reflected light information DiRefl input to the adjustment unit 132'. The coefficient generation unit 1320D' applies, for example, the coefficient "1" to an area other than the area indicated by the subject area information Subj in the directly reflected light information DiRefl. As a result, in the multiplier 1321D', multiplication by the coefficient $k_D$ is selectively executed on the area indicated by the subject area information Subj, and scale adjustment can be performed on the area indicated by the subject area information Subj in the directly reflected light information DiRefl.

The same processing as that of the above-described coefficient generation unit 1320D' can be applied to the coefficient generation unit 1320R' which generates the coefficient $k_R$ for the RAW image information RAW, and thus, detailed description thereof is not given here.

Processing in Distance Measuring Device According to Third Embodiment

Figure 24:
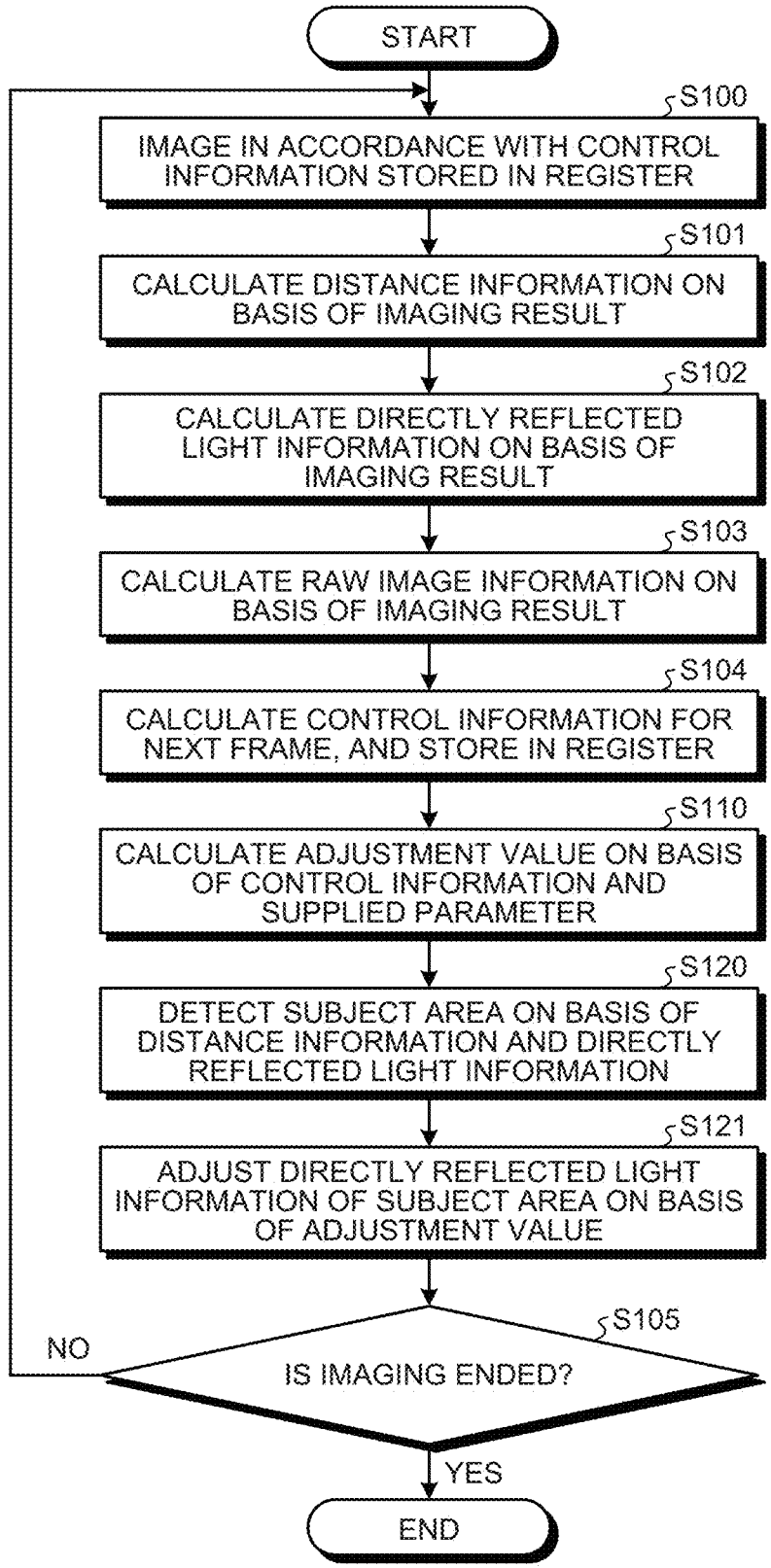
FIG. 24 is a flowchart illustrating one example of processing in the distance measuring device according to the third embodiment.

FIG. 24 is a flowchart illustrating one example of processing in the distance measuring device 10c according to the third embodiment. Similarly to the flowchart of FIG. 20, for example, when an imaging start instruction instructing to start imaging (distance measurement) is passed from the application unit 20 to the distance measuring device 10c, the processing according to the flowchart of FIG. 24 is started. At the same time, the application unit 20 passes the parameter Param including the information indicating the operation mode of the application unit 20 and the target information target for the directly reflected light information DiRefl and the RAW image information RAW to the distance measuring device 10c.

In the flowchart of FIG. 24, the processing of steps S100 to S104 is similar to the corresponding processing of FIG. 20 described above, and thus the detailed description thereof is not given here. When obtaining a control signal for controlling the light source unit 11 and the light receiving unit 12 in step S104, the distance measuring device 10c shifts the processing to step S110. The processing in step S110 is the same as the processing in step S110 in FIG. 20 described above, and thus the detailed description thereof will be not given here.

In step S110, the distance measuring device 10c calculates an adjustment value for performing scale adjustment on the directly reflected light information DiRefl and the RAW image information RAW on the basis of the control information and the parameter Param. After passing the calculated adjustment value to the adjustment unit 132, the distance measuring device 10c shifts the processing to step S120.

In step S120, the distance measuring device 10c causes the subject detection unit 134 to detect a specific subject included in one frame on the basis of at least one of the distance information Depth and the directly reflected light information DiRefl of the frame output from the distance measuring unit 131. The subject detection unit 134 obtains, as the subject area, an area in the frame in which the specific subject is detected, and acquires coordinate information of the subject area. The subject detection unit 134 passes the subject area information Subj indicating the subject area to the adjustment unit 132'.

In the next step S121, the distance measuring device 10c causes the adjustment unit 132' to perform scale adjustment on the area indicated by the subject area information Subj passed from the subject detection unit 134 in step S120 in the directly reflected light information DiRefl supplied from the distance measuring unit 131 on the basis of the adjustment value calculated in step S110. The adjustment unit 132' can further perform scale adjustment on the area indicated by the subject area information Subj passed from the subject detection unit 134 in step S120 in the RAW image information RAW supplied from the distance measuring unit 131 on the basis of the adjustment value calculated in step S110.

The directly reflected light information Scaled_DiRefl in which the area indicated by the subject area information Subj is scale-adjusted is output from the adjustment unit 132' and supplied to the application unit 20. In a case where scale adjustment is performed on the area indicated by the subject area information Subj in the RAW image information RAW, the adjustment unit 132' supplies the scale-adjusted RAW image information Scaled_RAW to the application unit 20.

In the next step S105, the distance measuring device 10c determines whether or not imaging is ended. For example, in a case where the distance measuring device 10c receives an imaging end instruction from the application unit 20, the distance measuring device determines that the imaging is ended (step S105, "Yes"), and ends a series of processing according to the flowchart of FIG. 24.

On the other hand, in a case where the distance measuring device 10c determines that the imaging is not ended (Step S105, "No"), the processing returns to step S100. The processing of steps S100 to S105 including steps S110, S111, S120, and S121 is repeated, for example, in units of one frame.

As described above, in the third embodiment, scale adjustment can be selectively performed on the area indicated by the subject area information Subj in the frame in the directly reflected light information DiRefl and the RAW image information RAW. Therefore, a specific subject can be emphasized in the frame. As a result, for example, it is possible to improve convenience when the application unit 20 uses the directly reflected light information DiRefl and the RAW image information RAW.

Incidentally, in the above description, the distance measuring device 10c calculates the directly reflected light information DiRefl and the RAW image information RAW, and performs scale adjustment on each area indicated by the subject area information Subj in the calculated directly reflected light information DiRefl and RAW image information RAW. However, this is not limited to this example. For example, the distance measuring device 10c may calculate only one of the directly reflected light information DiRefl and the RAW image information RAW, and perform scale adjustment on the area indicated by the subject area information Subj of the calculated information.

The distance measuring device 10c may calculate the directly reflected light information DiRefl and the RAW image information RAW, and the calculated distance measuring device 10a may perform scale adjustment on the area indicated by the subject area information Subj of any one of the directly reflected light information DiRefl and the RAW image information RAW. Among the directly reflected light information DiRefl and the RAW image information RAW, information to be calculated or scale-adjusted can be specified with respect to the distance measuring device 10c by the application unit 20, for example.

Fourth Embodiment

Figure 25:
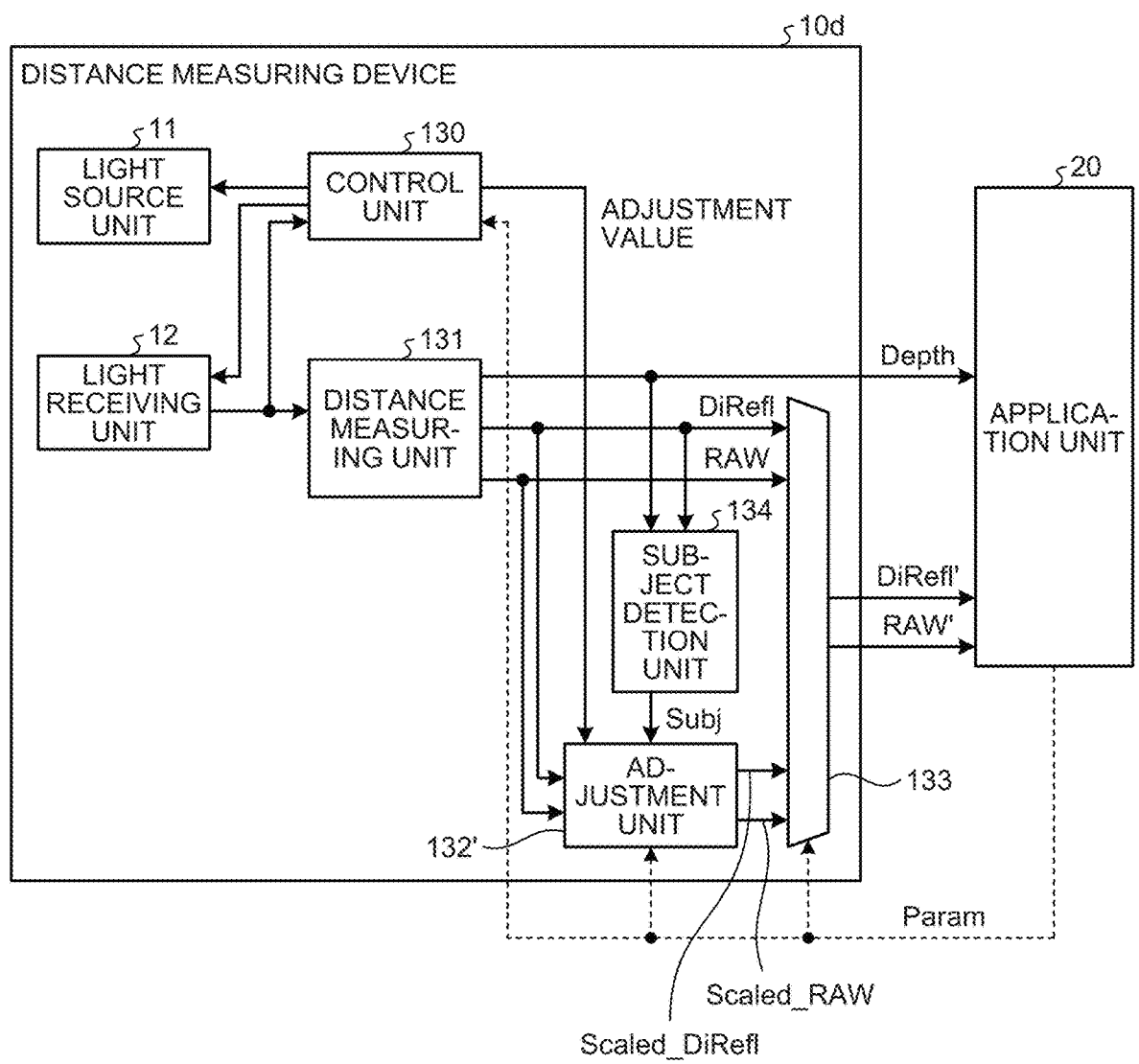
FIG. 25 is a functional block diagram illustrating one example of functions of a distance measuring device according to a fourth embodiment.

Next, a fourth embodiment of the present disclosure will be described. The fourth embodiment is an example in which the second embodiment and the third embodiment described above are combined. FIG. 25 is a functional block diagram illustrating one example of functions of a distance measuring device according to the fourth embodiment. In FIG. 25, in a distance measuring device 10d, the selector 133 in the distance measuring device 10b described using FIG. 21 is added to the distance measuring device 10c described using FIG. 22.

Similarly to the distance measuring device 10b in FIG. 21, the distance measuring device 10d according to the fourth embodiment inputs, to the selector 133, a set of the directly reflected light information DiRefl and the RAW image information RAW output from the distance measuring unit 131 and a set of the directly reflected light information Scaled_DiRefl and the RAW image information Scaled_RAW which are output from the adjustment unit 132 and subjected to scale adjustment. The selector 133 selects one of these two sets on the basis of, for example, information which is included in the parameter Param output from the application unit 20 and indicates the operation mode of the application unit 20. The selector 133 supplies the selected set of the directly reflected light information and the RAW image information to the application unit 20 as directly reflected light information DiRefl' and RAW image information RAW', respectively.

According to the distance measuring device 10d according to the fourth embodiment, the selector 133 selects one of the set of the directly reflected light information DiRefl and the RAW image information RAW which are not subjected to scale adjustment and the set of the directly reflected light information Scaled_DiRefl and the RAW image information Scaled_RAW in which the respective areas indicated by the subject area information Subj are selectively subjected to scale adjustment, and supplies the selected set to the application unit 20. Therefore, in the distance measuring device 10d, it is possible to provide the application unit 20 with a wider variety of usage modes of the directly reflected light information and the RAW image information and to improve convenience when the application unit 20 uses the directly reflected light information DiRefl and the RAW image information RAW.

Fifth Embodiment

In the first embodiment described above, in the description, the distance measuring device 10a is configured as a hardware device by the electronic device 2 including the CPU 100, the ROM 101, the RAM 102, the UI unit 104, the storage 103, the I/F 105, and the like, but this is not limited to this example. For example, the sensor unit 111 configured by laminating semiconductor chips illustrated in FIG. 10 or 11 can be configured to be one semiconductor element as a whole of the distance measuring device 10a including the control unit 130, the distance measuring unit 131, and the adjustment unit 132 illustrated in FIG. 14. This is similarly applicable to the distance measuring devices 10b, 10c, and 10d according to the second to fourth embodiments.

Incidentally, the effects described in this specification are merely examples and are not limited, and other effects may be present.

Incidentally, this technology may also be configured as below.

(1) A distance measuring device comprising:
  a distance measuring unit that calculates, when a light receiving unit performs light reception for each phase according to light emission of a light source unit, distance information on the basis of a light reception signal for each phase output by the light receiving unit according to the light reception for each phase;
  a control unit that controls a level of the light reception signal for each phase in accordance with the calculation of the distance information based on the light reception signal for each phase;
  a generation unit that generates an image signal on the basis of the light reception signal for each phase; and
  an adjustment unit that adjusts a level of the image signal according to an adjustment value, wherein
  the control unit generates the adjustment value on the basis of the light reception signal for each phase controlled according to the calculation of the distance information.

(2) The distance measuring device according to the above (1), further comprising:
  a detection unit that detects a subject area including a predetermined subject in an image area based on the image signal on the basis of the distance information calculated by the distance measuring unit and the image signal generated by the generation unit, wherein
  the adjustment unit adjusts the level of the image signal in the subject area on the basis of the adjustment value.

(3) The distance measuring device according to the above (1) or (2), further comprising:
  a selection unit that selects one of the image signal generated by the generation unit and an adjusted image signal obtained by the adjustment unit adjusting the level of the image signal.

(4) The distance measuring device according to any one of the above (1) to (3), wherein
  the generation unit generates the image signal based on a component of reflected light, which is received by the light receiving unit, of light emitted by light emission of the light source unit among components of light received by the light receiving unit.

(5) The distance measuring device according to the above (4), wherein
  the generation unit further generates the image signal based on components of the reflected light and the ambient light received by the light receiving unit.

(6) The distance measuring device according to any one of the above (1) to (5), wherein
  the control unit controls the level of the light reception signal for each phase by controlling an exposure length in the light receiving unit.

(7) The distance measuring device according to any one of the above (1) to (6), wherein
  the control unit controls the level of the light reception signal for each phase by controlling a duty of the light emission of the light source unit.

(8) The distance measuring device according to any one of the above (1) to (7), wherein
  the control unit controls the level of the light reception signal for each phase by controlling intensity of the light emission of the light source unit.

(9) The distance measuring device according to any one of the above (1) to (8), wherein
  the control unit controls the level of the light reception signal for each phase by controlling a gain of the light reception signal for each phase output by the light receiving unit.

(10) The distance measuring device according to any one of the above (1) to (9), wherein
  the control unit generates the adjustment value for canceling the control of the level of the light reception signal for each phase by the control unit on the basis of the light reception signal for each phase.

REFERENCE SIGNS LIST

1 ELECTRONIC DEVICE
10, 10a, 10b, 10c, 10d, 1000 DISTANCE MEASURING DEVICE
11 LIGHT SOURCE UNIT
12 LIGHT RECEIVING UNIT
13 DISTANCE MEASUREMENT PROCESSING UNIT
20 APPLICATION UNIT
30 EMISSION LIGHT
31 MEASUREMENT OBJECT
32 REFLECTED LIGHT
100 CPU
110 LIGHT SOURCE UNIT
111 SENSOR UNIT 130, 140 CONTROL UNIT
131, 141 DISTANCE MEASURING UNIT
132, 132' ADJUSTMENT UNIT
133 SELECTOR
134 SUBJECT DETECTION UNIT
1110 SENSOR CHIP
1111 PIXEL AREA
1120 CIRCUIT CHIP
1120a FIRST CIRCUIT CHIP
1120b SECOND CIRCUIT CHIP
1300 CONTROL VALUE GENERATION UNIT
1301 STORAGE UNIT
1310 DISTANCE MEASUREMENT CALCULATION UNIT
1312 DIRECTLY REFLECTED LIGHT INFORMATION CALCULATION UNIT
1313 RAW IMAGE INFORMATION CALCULATION UNIT
1320D, 1320D', 1320R, 1320R' COEFFICIENT GENERATION UNIT
1321D, 1321R MULTIPLIER

The invention claimed is:

1. A distance measuring device, comprising:
a light emitting element configured to emit light;
a light receiving element configured to:
   receive the light for each phase of a plurality of phases based on the emission of the light; and
   output a light reception signal for the each phase based on the reception of the light for the each phase; and
circuitry configured to:
   calculate distance information based on the light reception signal for the each phase;
   determine that the calculated distance information is one of equal to or greater than a threshold value;
   increase an exposure time of the light receiving element based on the determination that the calculated distance information is one of equal to or greater than the threshold value;
   control a level of the light reception signal for the each phase based on the increased exposure time;
   generate an image signal based on the light reception signal for the each phase;
   generate an adjustment value based on the controlled level of the light reception signal for the each phase; and
   adjust a level of the generated image signal based on the adjustment value.

2. The distance measuring device according to claim 1, wherein the circuitry is further configured to:
detect a subject area including a specific subject in an image area based on the distance information and the generated image signal, wherein the image area is based on the generated image signal; and
adjust, based on the adjustment value, the level of the generated image signal in the subject area.

3. The distance measuring device according to claim 1, wherein the circuitry is further configured to:
obtain an adjusted image signal based on the adjusted level of the generated image signal; and
select one of the generated image signal or the adjusted image signal.

4. The distance measuring device according to claim 1, wherein
the light received by the light receiving element includes a plurality of light components,
the plurality of light components includes a component of reflected light, and
the circuitry is further configured to generate the image signal based on the component of the reflected light.

5. The distance measuring device according to claim 4, wherein
the plurality of light components further includes a component of ambient light, and
the circuitry is further configured to generate the image signal based on the component of the reflected light and the component of the ambient light.

6. The distance measuring device according to claim 1, wherein the circuitry is further configured to:
control a duty of the emission of the light; and
control the level of the light reception signal for the each phase based on the controlled duty of the emission of the light.

7. The distance measuring device according to claim 1, wherein the circuitry is further configured to:
control intensity of the emission of the light; and
control the level of the light reception signal for the each phase based on the controlled intensity of the emission of the light.

8. The distance measuring device according to claim 1, wherein the circuitry is further configured to:
control a gain of the light reception signal for the each phase output by the light receiving element; and
control the level of the light reception signal for the each phase based on the controlled gain of the light reception signal.

9. The distance measuring device according to claim 1, wherein the circuitry is further configured to cancel the control of the level of the light reception signal based on the generated adjustment value.

* * * * *